United States Patent [19]

Sheppard et al.

[11] Patent Number: 5,130,936

[45] Date of Patent: Jul. 14, 1992

[54] METHOD AND APPARATUS FOR DIAGNOSTIC TESTING INCLUDING A NEURAL NETWORK FOR DETERMINING TESTING SUFFICIENCY

[75] Inventors: John W. Sheppard, Glen Burnie; William R. Simpson, Edgewater; Jerry L. Graham, Baldwin, all of Md.

[73] Assignee: Arinc Research Corporation, Annapolis, Md.

[21] Appl. No.: 582,383

[22] Filed: Sep. 14, 1990

[51] Int. Cl.$^5$ .................... G01R 31/28; G05B 15/00
[52] U.S. Cl. .................... 364/551.01; 395/22; 395/911; 324/73.1; 364/559; 364/580
[58] Field of Search ............ 364/513, 550, 551.01, 364/554, 580, 579; 371/15.1, 20.1, 25.1, 26; 324/73.1

[56] References Cited

U.S. PATENT DOCUMENTS

| | | | |
|---|---|---|---|
| 4,620,286 | 10/1986 | Smith et al. | 364/513 |
| 4,644,479 | 2/1987 | Kemper et al. | 364/554 X |
| 4,649,515 | 3/1987 | Thompson et al. | 364/900 |
| 4,796,206 | 1/1989 | Boscove et al. | 364/551.01 |
| 4,841,456 | 6/1989 | Hogan, Jr. et al. | 364/550 |
| 4,866,635 | 9/1989 | Kahn et al. | 364/513 |
| 4,918,620 | 4/1990 | Ulug | 364/513 |
| 4,970,725 | 11/1990 | McEnroe et al. | 364/551.01 X |
| 4,979,124 | 12/1990 | Sachse et al. | 364/550 X |

OTHER PUBLICATIONS

Guthmiller et al., "FAME-An Expert System for Failure Analysis of Metals," Conference: ISTFA'87: Advanced Materials, Los Angeles, 9-13 Nov. 1987.
Marko et al., "Automotive Control System Diagnostics Using Neural Nets for Rapid Pattern Classification of Large Data Sets," IJCNN, pp. II-13 to II-16, 18-22 Jun. 1989.
Shortliffe, E. H., Computer Based Medical Consultations: Mycin, American Elsevier, New York, 31 Dec. 1976.
David, R., Diagnostic Reasoning Based on Structure, Artificial Intelligence, vol. 32, pp. 97-130, 31 Dec. 1987.
Piptone, F., The FIS Electronics Troubleshooting System, IEEE Compuer, pp. 68-75, Jul. 1986.
McLeish, M., A Note on Probabilistic Logic, AAAI--88, pp. 215-219, 31 Dec. 1988.
Zadeh, L., Fuzzy Logic, IEEE Computer, pp. 83-93, Apr. 1988.
Dempster, A. P., A Generalization of Bayesian Inference, Journal of the Royal Statistical Society, Series B, pp. 205-247, 31 Dec. 1968.
Shafer, G., A Mathematical Theory of Evidence, Princeton University Press, pp. 35-73, 31 Dec. 1976.
Allred, Lloyd, Neural Networks in Automatic Testing of Diode Protection Circuits Autotestcon, pp. 181-186, 1989.

Primary Examiner—Parshotam S. Lall
Assistant Examiner—Thomas S. Auchterlonie
Attorney, Agent, or Firm—Oliff & Berridge

[57] ABSTRACT

A diagnostic tester evaluates at least one inputted test signal corresponding to test data relating to at least one predetermined parameter of a system being tested, to produce first and second candidate signals corresponding respectively to first and second possible diagnoses of the condition of the system respectively having the first and second highest levels of certainty of being valid, and first and second certainty signals corresponding respectively to values of the first and second highest levels of certainty. The diagnostic tester further determines the sufficiency of the testing that has taken place responsive to the first and second certainty signals, and produces an output signal indicative of whether sufficient test data has been evaluated to declare a diagnosis. Preferably, an uncertainty signal corresponding to a measure of the uncertainty that the evaluated at least one test signal can be validly evaluated is also produced and used to produce the output signal.

31 Claims, 8 Drawing Sheets

METHOD AND APPARATUS FOR DIAGNOSTIC TESTING INCLUDING A NEURAL NETWORK FOR DETERMINING TESTING SUFFICIENCY

FIELD OF THE INVENTION

The present invention relates generally to diagnostic testing, and more particularly to methods and apparatus for diagnostic testing using evidential reasoning and for determining when sufficient information has been collected to make a valid diagnosis.

BACKGROUND OF THE INVENTION

The assignee of the present invention has previously developed a portable interactive diagnostic tester for fault isolation in complex electromechanical systems called POINTER. POINTER utilizes a model-based, matriximplemented inferential reasoning method of diagnostic analysis. The diagnostic model is created using the STAMP (System Testability and Maintenance Program) program also available from the assignee of the present invention, ARINC Research Corporation. STAMP is an interactive modeling tool designed to permit analysis of the testability of a system and generation of static fault isolation strategies. STAMP assumes that the system design is known, tests can be specified that measure the goodness and badness of system elements, and sequences of test outcomes can be used to localize or isolate failed system elements. The STAMP diagnostic model describes the flow of information through a system to be diagnosed. The information flow is represented as a set of diagnostic tests (information sources), a set of diagnoses (conclusions to be drawn), and a set of logical relationships between the tests and the conclusions. In addition, the model includes parameters for weighting a test selection optimization process, grouping tests and conclusions, and specifying types of tests to be performed (e.g. functional tests, conditional tests, or asymmetric tests). Under the STAMP methodology, an assumption is made that only one fault exists or that specific multiple faults can be specified and treated as a single fault, and thus that only one conclusion is true for any one diagnostic analysis. (If the system under test actually has multiple faults, they can usually be successively isolated by repeating the diagnostic analysis, unless a "hidden" failure causes the failure which is isolated or a multiple failure looks like an independent single failure.) Evidence from an individual test flows to a set or sets of diagnostic conclusions as either support or denial evidence in accordance with the defined logical relationships. That is, a logical proposition consisting of a set of dependency, or support, functions is established or defined which identifies the conclusions related to a given test and allocates the evidence generated by a test measurement to the set of related conclusions. An example of a higher-order proposition relating a test $t_5$ to a set of conclusions $c_1, c_2, \ldots c_n$ is:

| | |
|---|---|
| If ($t_5$) then $c_1$ or $c_2$ or $\ldots c_n$ | implication |
| If ($\sim c_1$ and $\sim c_2$ and $\sim \ldots c_n$) then $\sim t_5$ | negation |
| If ($\sim t_5$) then $\sim c_1$ and $\sim c_2$ and $\ldots \sim c_n$ | symmetry |

Each unique test has two different support functions, one for each type of evidence (support or denial). There is thus a set of conclusions that are supported and a set of conclusions that are denied by a given test outcome. That is, every conclusion in the model is supported or denied by each test outcome. A test supports a conclusion when the test outcome is consistent with a conclusion value of true. A test denies a conclusion when its outcome is not consistent with a conclusion value of true. In addition, component-to-component dependencies in the system are not modelled, and thus an assumption is made that the evidence for a given conclusion is determined solely by the tests that are related to it, not by other conclusions that may resemble its component parts.

The test measurement results are evaluated and specified as indicating that the tested system element is "Good," "Bad" or "Unknown" (results not available). A Bad test outcome is equated to be a logically True value of the proposition that corresponds to the test; and a Good test outcome equates to a logically False value of the corresponding test proposition. In the example given above, testing would evaluate the outcome of $t_5$, and then the truth or falsity of other propositions and conclusions are inferred using the applicable set of support functions. Thus, the STAMP process can be generally described as solving a set membership problem. If a given test is Bad, it implies one of n higher-order causes. If another test is Good, it implies that all of the potential causes of its being Bad are not possible conclusions, so that the complementary set (all potential causes that are still possible) is possible. STAMP operates to ascertain the intersections of the possible conclusion sets.

The STAMP paradigm has proven successful in solving a large number of testability and fault-isolation problems. However, many important problem domains involve uncertainty in both the statements of relation between tests and conclusions and the interpretation of the test measurements. For example, the model assumes that the relationships between the information sources and the diagnostic conclusions are clearly discernible, well defined, and unambiguous. It may not be possible, though, to establish a model which is both accurate and complete, i.e., a model in which each conclusion is properly related to each test result, and all of the conclusions which should be related to a test result are specified. Further, the test information may be ambiguous, difficult to interpret, or the user doing the testing and interpreting may have inadequate skill levels to produce reliable test results. Thus, an indicator is needed which measures how well the modelled relations are fitting the problem to which they are being applied. A number of different approaches have been developed in the artificial intelligence field to deal with the uncertainty created by these problems. Generally referred to as "reasoning under uncertainty," examples of such approaches include the use of certainty factors, probabilistic reasoning and weighted causal networks. In addition, there are various logics that take into account aspects of uncertainty such as predicate calculus, multivalued logics, modal logics, non-monotonic reasoning, intuitional logic, truth maintenance, "fuzzy" logic, and Dempster-Shafer evidential reasoning.

However, it is difficult in general to integrate reasoning under uncertainty concepts with the massive structure and processes associated with a complex, matrix-implemented inferential reasoning process like STAMP. Further, although the Dempster-Shafer evidential reasoning approach is well adapted for use in an inferential diagnostic process like STAMP, even this approach to dealing with uncertainty creates a number of serious problems. First, while a purely inferential form of STAMP provides a very good method for optimizing the choice of the next test to maximize the efficiency of the diagnostic process, this method breaks down when an evidential reasoning approach is adopted. Heretofore, the problem of test selection has not been addressed in the field of evidence combination. Second, the process of identifying the conclusions, observations and relationships that should be involved in a given evidential diagnostic process is much more difficult than with a strictly inferential process. Third, the Dempster-Shafer technique is flawed in the way it handles total uncertainty. If any test is performed that provides any evidence in support of some conclusion, then uncertainty is reduced—even in the event of a conflict with known information. Ultimately, as further testing is conducted, uncertainty disappears altogether, independent of the test results. Fourth, applying uncertainty calculations to an inferential system makes the criteria for determining when a diagnostic conclusion may be properly drawn unclear. There is thus a need to determine at what point enough information has been gathered to declare a valid diagnosis, or, in the context of fault isolation, to determine the point at which additional testing is providing minimal useful new information.

SUMMARY OF THE INVENTION

It is therefore a principal object of the present invention to provide improved diagnostic testing methods and apparatus which deal with uncertainty and overcome the deficiencies of conventional approaches.

It is a further object of the present invention to provide improved evidential reasoning based diagnostic testing methods and apparatus which overcome the limitations of the Dempster-Shafer approach.

It is a still further object of the present invention to provide methods and apparatus for determining the sufficiency of testing in diagnostic testing methods and apparatus which deal with uncertainty.

It is another object of the present invention to provide a neural network method and apparatus for determining the sufficiency of testing in diagnostic testing methods and apparatus dealing with uncertainty wherein the neural network can be trained to have generic application to different diagnostic models and different systems.

These and other objects of the present invention are achieved in accordance with one aspect of the present invention by a diagnostic tester comprising evaluating means, responsive to at least one inputted test signal corresponding to test data relating to at least one predetermined parameter of the system being tested, for producing first and second candidate signals corresponding respectively to first and second possible diagnoses of the condition of the system respectively having the first and second highest levels of certainty of being valid, and first and second certainty signals corresponding respectively to values of the first and second highest levels of certainty. The diagnostic tester further comprises testing sufficiency determining means, responsive to the first and second certainty signals, for producing an output signal indicative of whether sufficient test data has been evaluated to declare a diagnosis. Preferably, the evaluating means also produces an uncertainty signal corresponding to a measure of the uncertainty that the evaluated at least one test signal can be validly evaluated; and the testing sufficiency determining means also evaluates the uncertainty signal to produce the output signal.

In accordance with another aspect of the present invention, a diagnostic tester advantageously comprises means for storing a model of predetermined information flow relationships within the system under test; means for associating the test signals with sets of possible causes in accordance with the model, and for ascertaining the intersections of the sets of possible causes for combinations of test signals, the candidate signals being derived from the intersections; and means for determining for each candidate signal a measure of the level of certainty that it represents a valid diagnosis.

In accordance with still another aspect of the present invention, a diagnostic tester advantageously comprises means for defining a plurality of conclusions corresponding to possible diagnoses of the system; means for assigning a confidence value to each successively inputted test signal; means for calculating the support and denial for each conclusion based on the confidence value of the currently inputted test signal; means for determining if the currently inputted test signal conflicts with a then selected set of said conclusions corresponding to candidate signals; means for obtaining a measure of internal conflict based on accumulated total support values and the current test signal support values for all of the conclusions; means for computing the present value of the uncertainty signal based on the number of test signals evaluated, if the present test signal is not a conflict; and based on the number of test signals evaluated and the number of conflicts, if the present test signal is a conflict; means for computing a new total support value for each conclusion based on the old total support value, the present test signal support value and confidence value, an old uncertainty value, and the measure of internal conflict; means for computing a new uncertainty value based on the old uncertainty value, the present test signal confidence value and the measure of internal conflict; means for normalizing the total support value for each conclusion based on the old total support value, and the present uncertainty signal value; means for computing a new total denial for each conclusion based on an old total denial and the present test signal denial value; means for computing the present plausibility for each conclusion based on the present total denial and the number of test signals evaluated; means for selecting the current set of candidate signals based on the present total support and the plausibility for each conclusion.

In accordance with yet another aspect of the present invention, a diagnostic tester advantageously comprises first means for successively selecting an information source from among a plurality of information sources for interrogation according to the relative amount of information provided by each information source until all of the information sources have been selected or the information which would be provided thereby has been determined; and second means for successively further selecting an information source from among the plurality of information sources for interrogation according to which information source will increase the level of certainty that a selected candidate conclusion constitutes a valid diagnosis of the system being tested.

These and other features and advantages of the present invention are disclosed in or apparent from the following detailed description of preferred embodiments.

BRIEF DESCRIPTION OF THE DRAWINGS

The preferred embodiments are described with reference to the accompanying drawings, wherein like features have been designated with like reference numbers, and wherein.

DETAILED DESCRIPTION OF PREFERRED EMBODIMENTS

Figure 1:
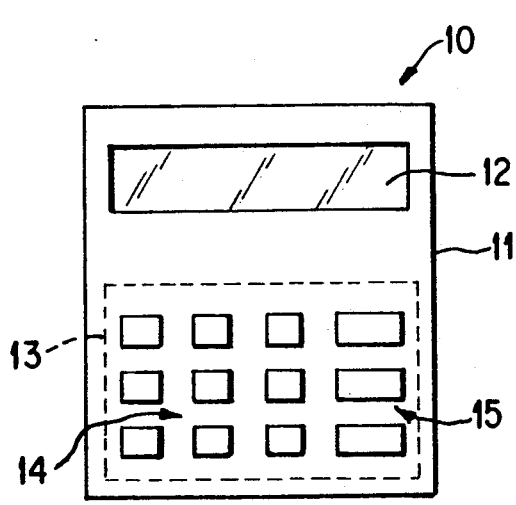
FIG. 1 is a diagrammatic view of a first embodiment of a diagnostic tester according to the present invention.
Figure 4:
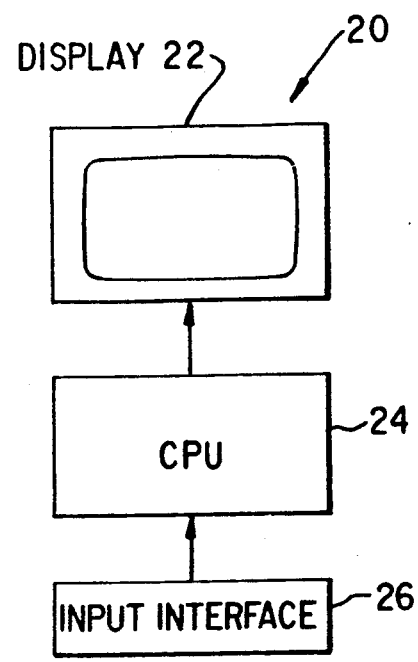
FIG. 4 is a diagrammatic view of a second embodiment of diagnostic tester according to the present invention.
Figure 5:
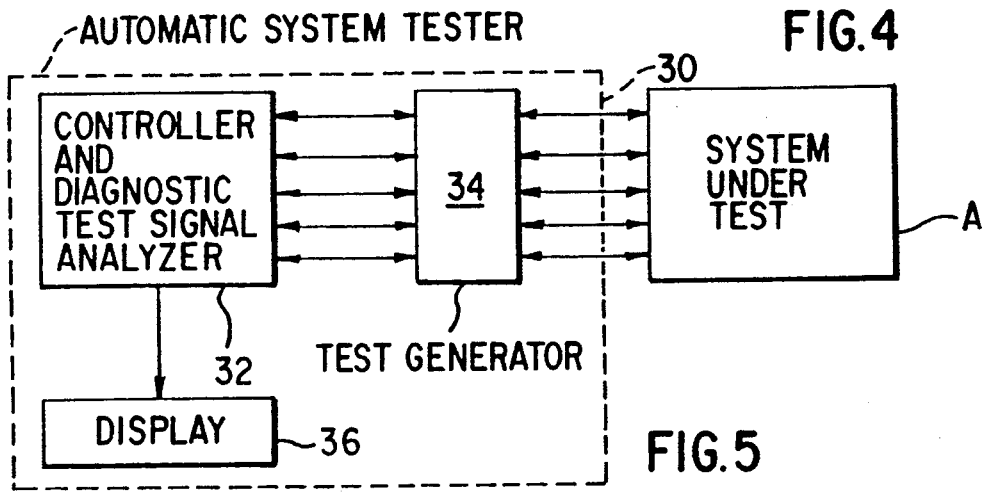
FIG. 5 is a schematic block diagram of an automatic system tester incorporating diagnostic testing apparatus in accordance with the present invention.
Figure 6:
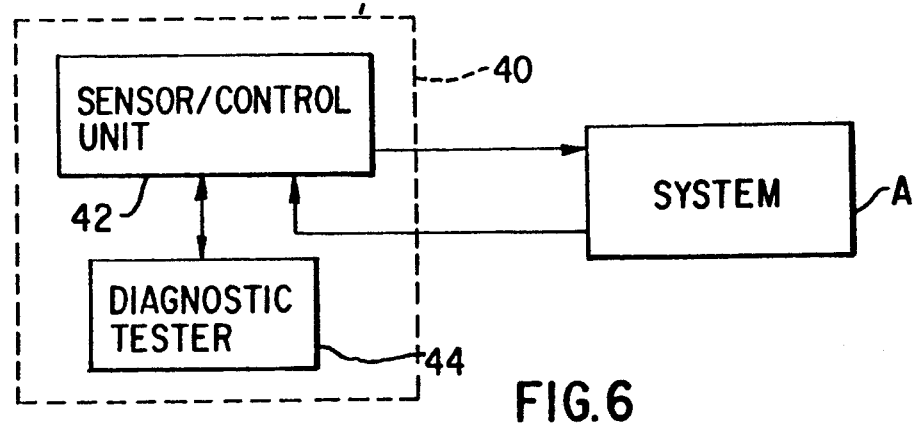
FIG. 6 is a schematic block diagram of a system controller incorporating diagnostic testing apparatus in accordance with the present invention.
Figure 2:
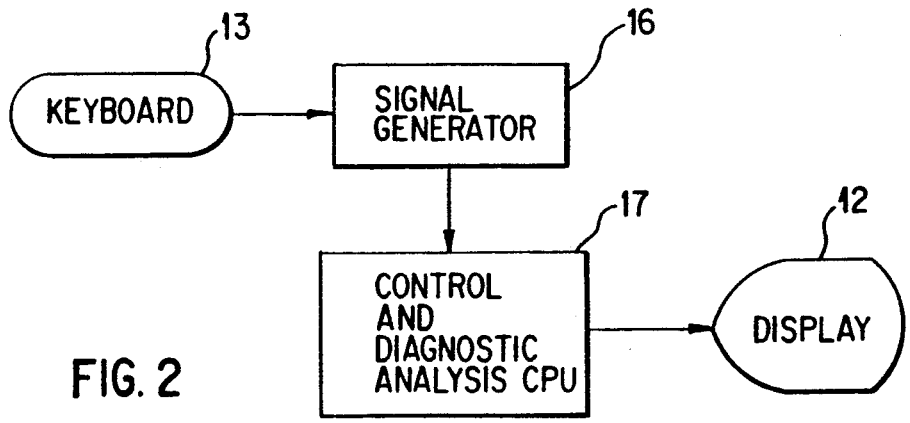
FIG. 2 is a schematic block diagram of the basic functional components of the diagnostic tester of FIG. 1.
Figure 3:
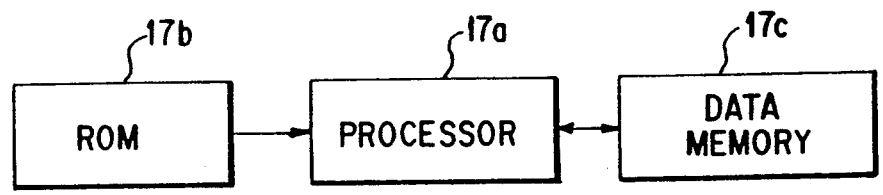
FIG. 3 is a schematic block diagram of the control and diagnostic analysis CPU of FIG. 2.

Referring to FIGS. 1-6, the diagnostic testing methods and apparatus of the present invention advantageously are incorporated in diagnostic testers which are adapted to receive test data input from an operator or from other sources (FIGS. 1-4); in automatic system testers which are adapted to automatically both test a system and analyze the test results (FIG. 5); or in automatic system controllers which sense the condition of the controlled system and control the operation of the system in response thereto (FIG. 6). The present invention may also readily be embedded within systems having self-diagnosis capabilities as part of the self diagnosis architecture As shown in FIGS. 1-3, one form of manual input diagnostic tester which is portable has a separate housing 11 which contains the tester components; a display 12 mounted in housing 11 for displaying test results, diagnoses, user prompts and similar types of information; a keyboard area 13 comprising a plurality of data entry keys 14 and a plurality of command keys 15 for entering test data and user commands to control the operation of the tester; conventional signal generating circuitry 16 responsive to actuation of keys 14 and 15 for generating digital electrical test and command signals, respectively, corresponding to the test data and commands entered by the operator; and a control and diagnostic analysis central processing unit (CPU) 17 for controlling the operation of the tester and performing the diagnostic analysis routines stored therein. As is conventional, CPU 17 comprises a processor 17a for performing control and analysis operations under control of an operating program stored in a read-only memory (ROM) 17b, and a further data memory 17c for storing inputted test and command signal data and the data generated in the course of operation of processor 17a.

Referring to FIG. 4, another form of a diagnostic tester in accordance with the present invention comprises a conventional general purpose or dedicated computer system 20 comprising a display 22, a CPU 24 programmed to perform diagnostic analysis routines, and an input interface 26 for receiving test data and command signal input. As will be appreciated by those skilled in the art, CPU 24 has the same general functional organization as CPU 17 shown in FIG. 3. Input interface 26 advantageously comprises a conventional keyboard or other user interface device for generating test data and command signals in response to operator actuation of the device, or a conventional peripheral interface device for receiving test data and command signals from a peripheral source such as a storage memory or system controller; and converting, if appropriate, the test data and command signals to digital signals in a form compatible for processing by CPU 24.

Referring to FIG. 5, an automatic system tester 30 for testing a system A which incorporates a diagnostic tester in accordance with the present invention comprises a controller and diagnostic test signal analyzer 32 for generating control signals to control the operation of tester 30 and for analyzing test signals indicative of the nature or condition of system A which are generated by tester 30; a test generator system 34 for performing predetermined tests on system A responsive to control signals generated by controller/analyzer 32 and for generating the test signals corresponding to the test results; and a display 36 responsive to control signals from controller/analyzer 32 for displaying test information, diagnoses, user prompts and the like.

Referring to FIG. 6, a diagnostic tester in accordance with the present invention is shown incorporated in a system controller 40 controlling the operation of a system A. System controller 40 comprises a sensor/control unit 42 for sensing predetermined system operating parameters and for generating control signals for controlling the operation of system A; and a diagnostic tester 44 for evaluating the sensor data and generating output signals used by sensor/control unit 42 for generating the control signals.

The diagnostic tester of the present invention has broad application in determining the nature or condition of a variety of systems, ranging, for example, from determining faults and malfunctions in electronic or electromechanical systems or manufacturing processes, to selecting the appropriate control response according to the sensed state of a controlled system, to identifying a disease or other abnormal condition in an organism, to identifying objects within a space, to classifying animals or other objects or materials according to a taxonomy or other classification scheme. For the sake of clarity, the diagnostic tester of the present invention will be specifically described hereinbelow in the context of fault diagnosis of complex systems, wherein malfunctioning systems having a plurality of functional components or elements are analyzed to isolate the source of a fault.

Figure 7:
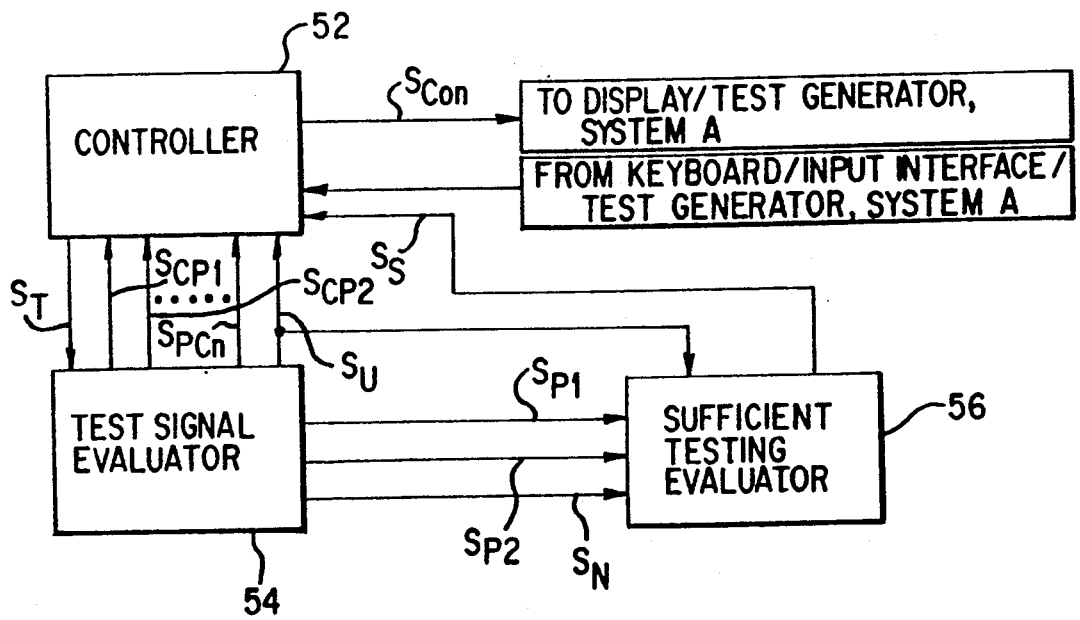
FIG. 7 is a schematic block diagram of the controller and diagnostic test signal evaluating sections of a diagnostic tester according to the present invention.

Referring to FIG. 7, the basic preferred functional configuration of processor 17a, CPU 24, controller and diagnostic test signal analyzer 32, and the control portion of sensor/control unit 42 and diagnostic tester 44 comprises a controller section 52, a test signal evaluation section 54, and a sufficient testing evaluation section 56. Controller section 52 generates control signals $S_{Con}$ for controlling the associated display 12, 22, 36 and/or test generator 34 and system A.

Test signal evaluating section 54 evaluates inputted test signal data $S_T$ resulting from testing or sensing of some aspect, referred to hereinafter as a parameter, of system A, and produces a plurality of n candidate signals $S_C$ corresponding to n possible diagnoses of, or diagnostic conclusions about the condition of system A, where $n \geq 2$, and each candidate signal $S_C$ has an associated level of certainty of representing a valid diagnosis, that is, a diagnosis having associated therewith an acceptable level of confidence that the diagnosis is correct. Hereinafter, the candidate signals having the first and second highest levels of certainty of being valid are denoted $S_{CP1}$ and $S_{CP2}$. Test signal evaluating section 54 also produces first and second certainty signals $S_{P1}$ and $S_{P2}$ corresponding respectively to measures or values of the first and second highest levels of certainty associated with candidate signals $S_{CP1}$ and $S_{CP2}$. Test signal evaluating section 54 also preferably produces uncertainty signals $S_U$ corresponding to a measure of the uncertainty that the evaluated test signals $S_T$ can be validly evaluated to produce a diagnosis.

Sufficient testing evaluating section 56 produces an output signal $S_S$ indicative of whether sufficient test data has been evaluated to declare a diagnosis based on at least the certainty signals $S_{P1}$ and $S_{P2}$, and preferably also based on uncertainty signal $S_U$. In addition, test signal evaluating section 54 advantageously also generates an associated signal $S_N$ corresponding to a measure of the level of certainty that a conclusion other than $S_{CP1}$, $S_{CP2}$ and $S_U$ is the correct diagnosis, and the output signal $S_S$ of sufficient testing evaluating section 56 is also based on signal $S_N$.

Figure 8:
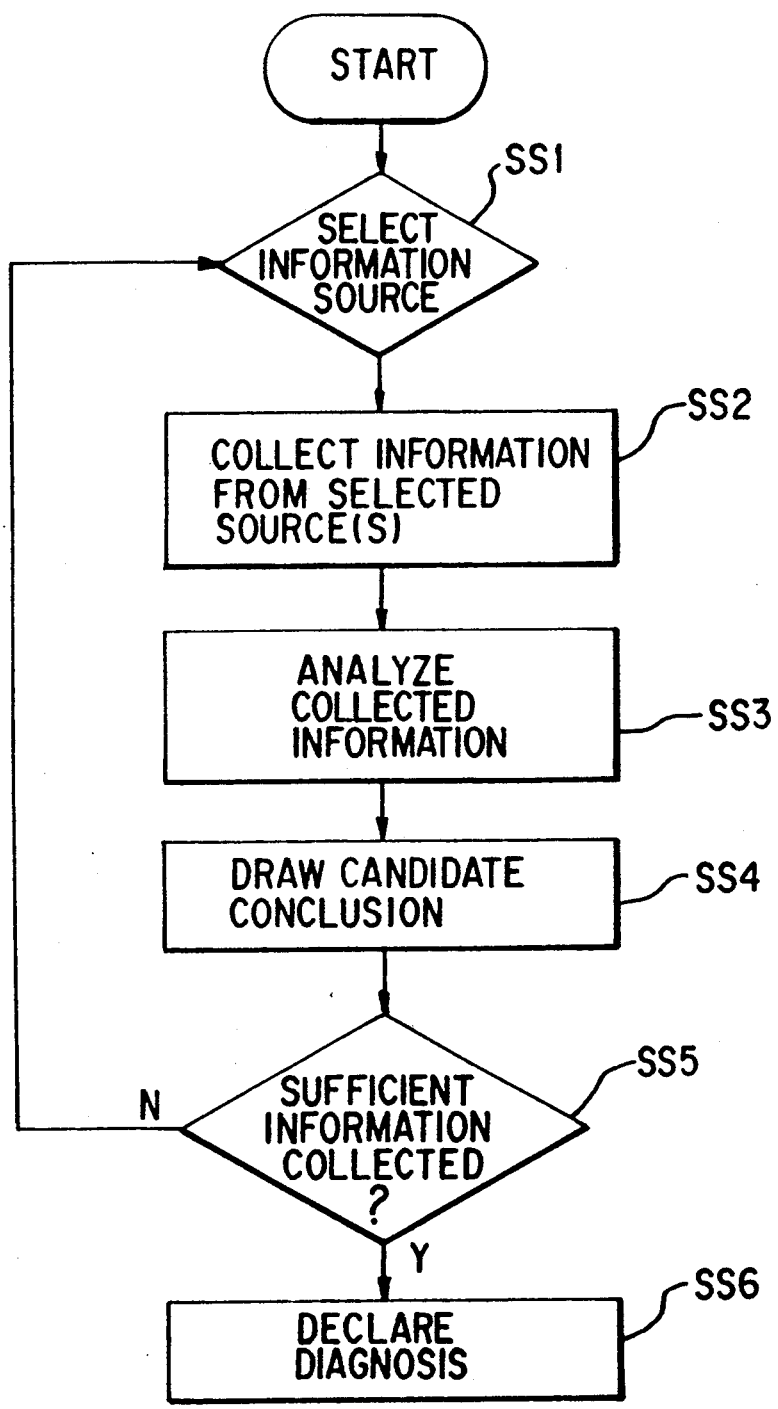
FIG. 8 is a general flow chart of a diagnostic process performed by a diagnostic tester in accordance with the present invention.

Referring to FIG. 8, in general, the procedure followed to make a system diagnosis in accordance with the present invention comprises the steps of selecting information sources (the diagnostic tests/sensed parameters) to be evaluated (step SS1); collecting information via these information sources (performing the selected test/sensing the selected parameter and evaluating the results to produce test data) (step SS2); analyzing the information (test data) collected (step SS3); drawing a candidate conclusion or conclusions about the situation examined (generating candidate signals $S_C$) (step SS4); and determining whether sufficient testing has been conducted to declare one or more of the conclusions as the diagnosis, or to declare that further testing is unlikely to establish a diagnosis (Step SS5). If the step SS5 determination is positive, then further testing is terminated and a diagnosis is declared, if appropriate (step SS6). If the step SS5 determination is negative, then the procedure is repeated by returning to step SS1, unless some other termination criterion is satisfied.

In accordance with the present invention, any conventional method can be used to select the tests to be performed/parameters to be sensed, and to collect the test data. Similarly, any conventional method can be used to analyze the test data and draw candidate conclusions (generate candidate signals $S_C$) which also provide a measure of the levels of certainty that the various candidate conclusions are valid. Examples of commonly used diagnostic approaches include protocol or decision tree based systems and simulation models; and so called "intelligent" systems such as rule-based expert systems, see e.g., Shortliffe, E. H. *Computer Based Medical Consultations: MYCIN*, American Elsevier, New York, 1976; model based expert systems, see e.g., Davis, R., "Diagnostic Reasoning Based on Structure," *Artificial Intelligence*, Vol. 32, pp. 97-130, 1987; dependency-based reasoners, see e.g., Piptone, F., "The FIS Electronics Troubleshooting System," IEEE Computer, pp. 68-75, 1986; and neural networks, see, e.g., Allred, Lloyd, "Neural Networks in Automatic Testing of Diode Protection Circuits," AUTOTESTCON '89, pp. 181-186. Examples of known methods which can be used to determine levels of certainty (or "pseudo" probabilities) have been cited hereinabove, and include probabilistic inference, see e.g., McLeish, M., "A Note on Probabilistic Logic," *AAAI88* pp 215-219, 1988; fuzzy logic, see e.g., Zadeh, L., "Fuzzy logic," *IEEE Computer*, pp. 83-93, April 1988; certainty factors, see e.g., MYCIN by Shortliffe, supra; and Dempster-Shafer evidential reasoning, see e.g., Dempster, A. P., "A Generalization of Bayesian Inference," *Journal of the Royal Statistical Society*, Series 8, pp. 205-247, 1968; and Shafer, G., *A Mathematical Theory of Evidence*, Princeton University Press, pp. 35-73, 1976. The rule-based expert system is perhaps the most common of the "intelligent" diagnostic systems. Experts are interviewed to determine how they diagnose, and rules are written to describe the process. Uncertainty is most frequently handled using probabilistic inference or certainty factors.

A preferred model-based method of test selection and test data analysis for fault diagnosis of complex systems in accordance with the present invention which employs a modified form of Dempster-Shafer evidential reasoning will now be described. In accordance with this method, the problem of diagnosis is approached as a collection of subproblems:

(1) Modeling: A diagnostic problem is treated as a modeling problem in which available information sources, the desired set of diagnostic conclusions, and their interrelationships are specified.

(2) Optimization: The information sources are selected for consideration in a way that optimizes the diagnostic process according to one or more criteria.

(3) Logical Inference: Test data derived from the information sources is used to draw inferences about other information sources and about the diagnostic conclusions in the model. The inferences are drawn based upon the relationships specified in the model.

(4) Statistical Qualification: Statistics describing the support and plausibility of each diagnostic conclusion in the model are computed based upon the information sources examined, the information collected, and the confidences in the reliability of that information.

(5) Statistical Inference: Statistics generated from collecting information from each information source are combined to determine the total support and plausibility for each diagnostic conclusion in the model.

These statistics are then used to estimate the probabilities that the corresponding conclusions constitute correct diagnoses. The resulting probabilities are then examined in the manner described in more detail hereinafter to determine if sufficient information has been collected to make a confident, valid diagnosis, and if not, whether further test data should be collected. If the determination is positive because sufficient information is deemed to have been collected, then further testing and evaluation are terminated and the diagnosis corresponding to candidate signal $S_{CP1}$ having the highest certainty level of being valid is declared as the diagnosis. Alternatively, if the determination is positive because the uncertainty due to conflict is such that no confident valid diagnosis can be made in the near term, then further testing and evaluation are terminated and the diagnosis which is declared is that corresponding to uncertainty signal $S_U$, i.e., that a valid diagnosis cannot be made. If the determination is negative because insufficient information has been collected, then further testing and evaluation are conducted until a positive determination is obtained, unless another termination criterion is satisfied. Two such criteria are whether a trend analysis indicates that additional test data collection is not improving the ability to select a conclusion as the fault diagnosis; and whether all information sources have been used a predetermined number of times without a determination being made that sufficient information has been collected. Preferably, the repetition limit varies for each test according to the confidence values (described in more detail hereinafter) assigned to the test. In the preferred embodiment, the standard limit is 4 unless the value of the greater of the Good and Bad base confidences is less than 0.85. Then the limit is reduced as follows:

if $0.75 < \text{Base} \leq 0.85$, then the limit = 3;
if $0.6 < \text{Base} \leq 0.75$, then the limit = 2; and
if $\text{Base} \leq 0.6$, then the limit = 1;
where Base is the greater base confidence value.

A typical fault isolation determination using a diagnostic model generated by the aforementioned STAMP program involves choosing tests, performing the tests, evaluating the results of the tests to assign a value of "Good," "Bad," or "Unknown" to the results, and qualitatively qualifying the "Good" and "Bad" values according to the confidence of the user in the result. (For example, the user can specify that the designated Good/Bad result is certain, somewhat certain, marginal, somewhat uncertain, or uncertain.) The qualifiers are then converted to numerical confidence factors which are used to compute evidential statistics (support and plausibility) for each conclusion provided in the model. The fault diagnosis process will now be described in detail with reference to FIGS. 9-13.

THE DIAGNOSTIC MODEL

Figure 9:
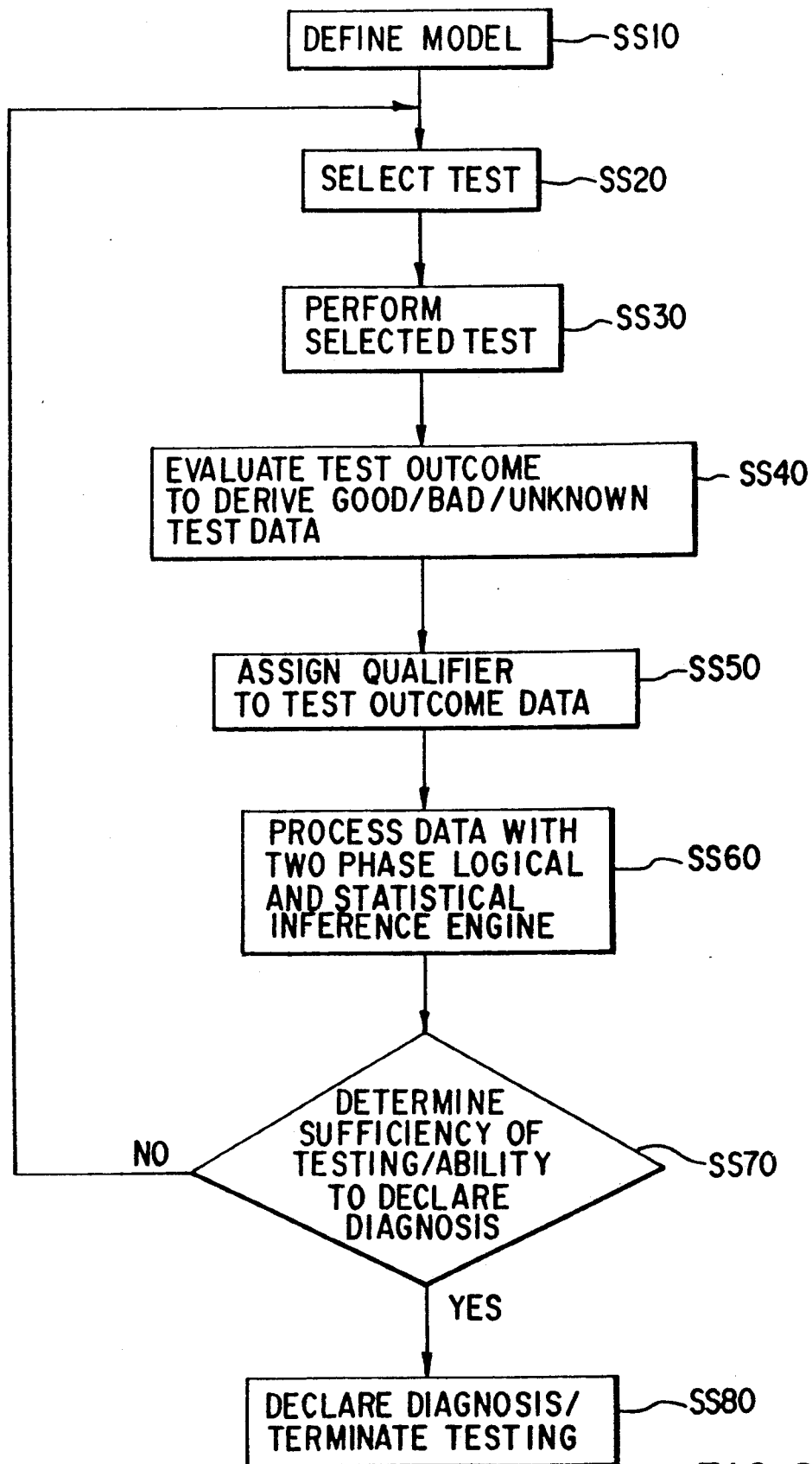
FIG. 9 is general flow chart of a preferred diagnostic process performed by a diagnostic tester in accordance with the present invention.

Referring to FIG. 9, the first step (SS 10), is to define the diagnostic model. Preferably, the diagnostic model used consists of a description of the flow of information through a system to be diagnosed. The information flow is represented as a set of diagnostic tests (information sources), a set of diagnoses (conclusions to be drawn), and a set of relationships between the tests and the conclusions. In addition, the model preferably includes parameters for weighting the test selection optimization process, grouping tests and conclusions, and specifying types of tests to be performed (e.g. functional tests, conditional tests, or asymmetric tests). The model may be specified as a topological description of a system, the dependency model between failure modes and probe tests, a collection of IF . . . THEN . . . rules as in a rule-based expert system, or any other formulation that describes the relationship between information sources and conclusions.

Advantageously, the tool used to develop the model is the aforementioned STAMP program, which is described in the ARINC Research publication, *STAMP User's Guide*, Tech. Note 213 (March, 1987), by the inventors Sheppard and Simpson herein, and which is hereby incorporated herein by reference. STAMP can be used to develop any model that meets the requirement described in the previous paragraph. The models generated by STAMP permit diagnoses to be performed in a dynamic, context sensitive environment. Diagnostic strategies are computed based on known information; and can be tailored and adapted to changing conditions, such as failing test equipment, or change of emphasis from minimum time to fault isolate to minimum required skill level to fault isolate.

GENERATING THE DIAGNOSTIC SEQUENCE

Once a model has been established (STAMP creates a computer readable file which is loaded into the processor constituting controller and test signal evaluating sections 52 and 54), the user may, optionally, specify a collection of symptoms and initial conditions (such as weighting criteria and groupings).

In order to provide an efficient and dynamic approach to diagnosis, two elements are essential: 1) a method of choosing information sources that result in a conclusion being reached utilizing a minimum amount of some required resource; and 2) a method for inferring information from actions taken by the user in order to adjust the diagnostic system's knowledge of the current state of the problem. The manner in which information sources are selected so as to optimize the diagnostic process in accordance with the present invention will be discussed next. The following discussion assumes that no grouping has been specified, no test outcomes (symptoms) have initially been determined, and a cost weight has been selected for information source selection optimization (i.e., the information source selection is biased in favor of a less expensive source (test) over a more expensive source).

Figure 10:
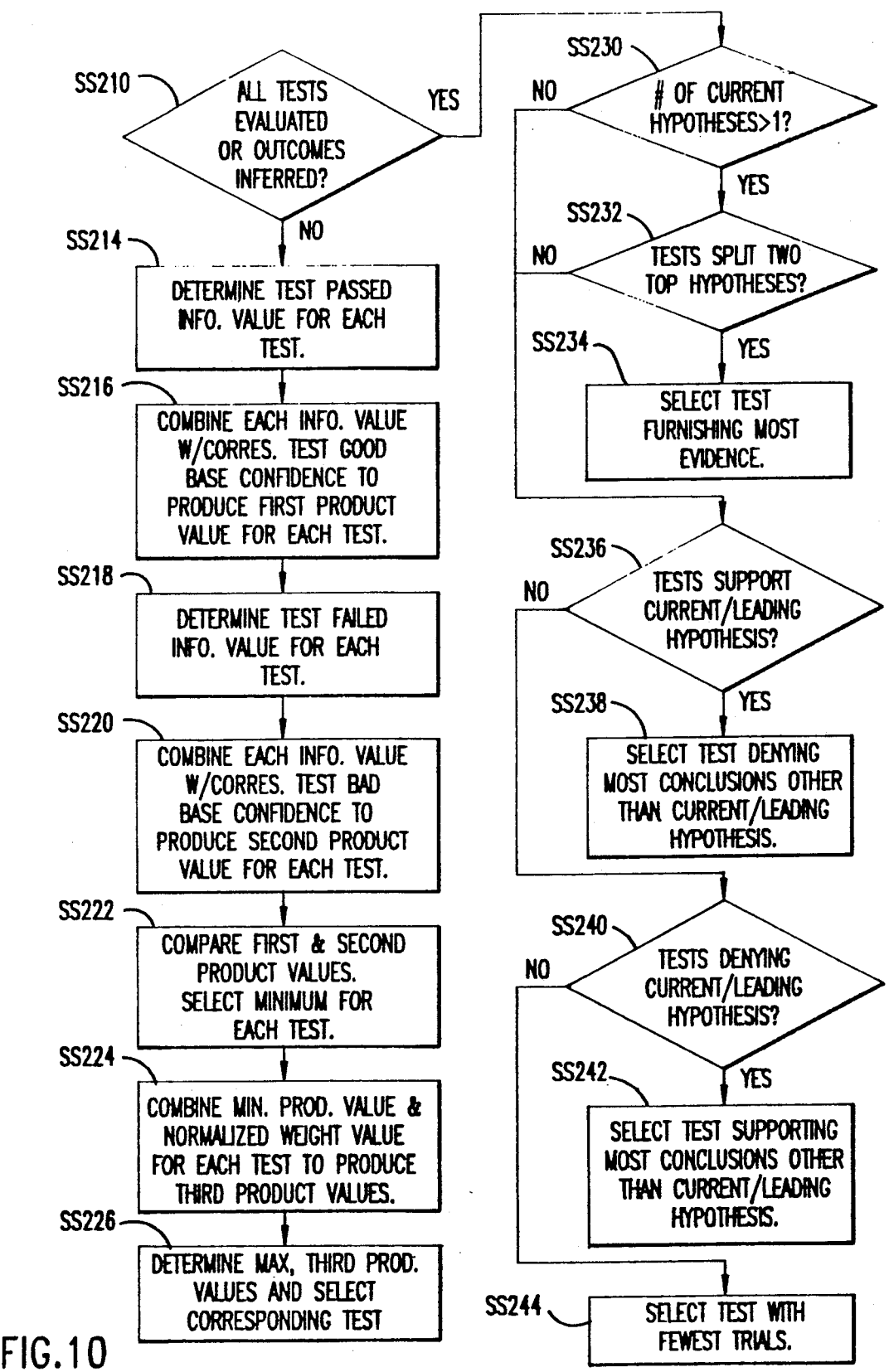
FIG. 10 is a more detailed flow chart of a preferred test selection process performed by a diagnostic tester in accordance with the present invention.

In the preferred embodiment a complete diagnostic sequence is generated in two test selection phases (step SS 20). The first phase (steps 214-226 of FIG. 10) consists of selecting tests based upon the amount of information they provide (and subject to any other selected weighting or grouping criteria). When a diagnostic procedure is first started, all of the tests in the model are available for consideration and all of the possible diagnostic conclusions in the model are still under consideration. If symptom information (or initial conditions) are then loaded by the user, they are used to prune the problem space using the inference metarules described below. At this point, some tests are still unknown and some conclusions have no evidence denying that they are possible. The tests that provide the most discriminating information about the candidate conclusion set regardless of the outcome of the individual tests are selected, as described in more detail hereinbelow. Referring to FIG. 9, when the selected test is performed (step SS30) and the results of a test are evaluated to produce test data (step SS40), the test data are processed by an inference engine, to be described hereinafter (step SS60), and another test is chosen in the same fashion as described above. Referring to FIG. 10, this process continues until there are no more tests to choose (i.e. all tests have either been evaluated or their outcomes have been inferred) (step SS210).

Referring still to FIG. 10, the specific process of choosing a test is based on Shannon's Theory of Information. For each test that is available, the amount of information that will be learned if the test passes (i.e., is good) is computed (step SS214). The amount of information learned from a good outcome is taken to be the number of tests that the test depends on plus the test itself. This test passed information value is then multiplied by the test's corresponding "good" "base confidence", a measure of the maximum confidence one can have in a good outcome, to produce a first product value (step SS216).

Then the amount of information that will be learned if the test fails (i.e. is bad) is computed (step SS218). The amount of information learned for a bad outcome is taken to be the number of tests that depend upon the test, plus the number of tests that can be designated "not needed," plus the test itself. A test may be designated as not needed if the test neither depends on nor is depended on by the test under consideration unless designating that test "not needed" creates a new ambiguity within the model. A new ambiguity is created if two or more conclusions that used to have different test dependency sets would have the same test dependency set because a test which is the only differentiator between the conclusions is the test about to be declared not needed.

Once computed, the test failed information value is then multiplied by the test's corresponding "bad" base confidence, a measure of the maximum confidence one can have in a bad outcome, to produce a second product value (step SS220). Base confidences are defined by the user for both good and bad test outcomes. The two values do not have to be equal.

Next, the minimum of the first and second product values is identified for each test (step SS222). Normalized weight values are then computed and multiplied by the minimums just stored to produce third product values. As with the base confidence values, cost and other direct weight values affecting test selection are also specified by the user (or learned from actual diagnostic experience). Direct weighting of the tests is accepted which is inversely proportional to the informational value of the test, and indirect weighting of the tests is accepted through weighting of the related conclusions which is directly proportional to the value of the test being weighted. As will be appreciated by those skilled in the art, a direct weight is a weighting factor applied directly to the tests in the model. Examples of direct weights include test time, test cost, or skill level required to test. An indirect weight $W_{Indirect}[j]$ applied to the conclusions in a model are attributed to the tests as follows:

$$W_{Indirect}[j] = \Sigma_i(w_i d_i)/\Sigma_i w_i$$

where
$w_i$ = a user-specified indirect weight associated with conclusion $c_i$
$t_j$ = a test $d_j = 0$; if $t_j$ does not depend on $c_i$
$d_j = 1$; if $t_j$ does depend on $c_i$.

Examples of indirect weights include failure rate, criticality and safety.

It will also be appreciated that when one or more weights are applied to information values in the test selection process, then an emphasis factor may also be associated with any weight which has the effect of increasing the significance of the weight over other weights and/or the information value. In addition, if test groupings have been specified, then three additional test selection features are available. First, time and cost penalties can be applied that affect time and cost weights until a test group is entered (a test within the group is selected). Second, specific sequencing of tests within groups can be defined which overrides normal test selection choices. Third, sequencing of entire test groups can be defined which also override normal test selection choices.

The normalization process results in the weights for a given criterion summing to 1.0. The maximum of the computed third product values is then determined (step SS226). The test with this maximum third product value is selected as the next test to evaluate.

During the first phase of test selection, an optional additional form of test selection advantageously also is provided. In this test selection mode, the user can specify that the selection be based on a hypothesis (discussed in more detail hereinafter) selected by the user. If the user selects a hypothesis, then all choice overrides and modifiers are disabled, and a test is chosen based on the following rules:

1. A test that has a Bad outcome and depends upon the hypothesis and a minimum number of other unknown conclusions.

2. A test that has a Good outcome and does not depend upon the hypothesis, but does depend upon a maximum number of other unknown conclusions.

The first of these rules is preferred over the second.

At the point all of the tests have a value (either given or inferred), as determined in step SS210, the second phase of choosing tests begins. At this point, one or more candidate failures (conclusions) have been identified and are given as a current hypothesis, as described in more detail hereinbelow. The levels of certainty associated with these failure conclusions are processed in the manner described in more detail hereinbelow to determine if enough evidence has been gathered to declare a diagnosis. If a determination is made that more evidence is necessary, and testing should not terminate, then another test needs to be chosen. At this point, rather than selecting a test that maximizes the amount of information about the system, an attempt is made to choose a test that will either separate multiple hypotheses or further support a single hypothesis. The purpose of this test choice process is to identify sources of evidence that will increase the level of certainty that a selected candidate conclusion (i.e. the current leading hypothesis, as defined hereinafter) is indeed the conclusion that should be drawn.

A test is chosen based on the quantity of evidence according to a process which can include up to four evaluation steps. First, if more than one current hypothesis exists (step SS230), then a test is chosen that splits the top two hypotheses (the two hypotheses with the highest associated levels of certainty) (step SS232). This is done by examining the dependencies and identifying which tests depend on one hypothesis and not the other hypothesis. The test that furnishes the most evidence and meets this criterion is selected (step SS234). If no tests exist that can separate hypotheses, or only one hypothesis exists, then the next evaluation step is performed. (The second and third evaluation steps attempt to find a test that provides the most support for the leading hypothesis. In both of these steps, it is assumed that a Bad test outcome is being sought.)

In the second evaluation step, if only one hypothesis has been selected, then the tests are evaluated to find the test that provides the most support for the hypothesis (step SS236). Similarly, if there are multiple current hypotheses, and the first step failed to choose a test, the tests are evaluated to find the test that provides the most support for the leading one of the hypotheses, i.e., the current hypothesis with the highest level of certainty associated therewith. The intent here is to further strengthen the current or leading hypothesis, which should bring the testing sufficiency evaluation process closer to terminating the fault isolation process. Specifically, only the tests that depend upon the current or leading hypothesis are considered. The test that denies the most conclusions other than the current/leading hypothesis is selected at this point (step SS238). To deny a conclusion, the test cannot depend on that conclusion. If no tests exist that support the current or leading hypothesis, then the next evaluation step is performed.

In the third evaluation step, in the event that a test has not been chosen from step 2, then tests that deny the current or leading hypothesis are examined (step SS240). To do this, only the tests that do not depend upon the hypothesis conclusion are considered. The test that supports the most conclusions other than the hypothesis is selected at this point (step SS242). To support a conclusion, the test must depend on that conclusion. If no tests exist that deny the current/leading hypothesis, then some test must be selected, and the last evaluation step is performed.

In the last evaluation step (SS244), in the event that no tests can be chosen that meet any of the above conditions, then the test with the fewest trials is selected just to select some test. If this fails to select a test, then advantageously the user may be offered the opportunity to choose a test. Failing user selection, an end to testing is declared even if the testing sufficiency evaluation otherwise indicates additional testing is appropriate.

INFERRING INFORMATION FROM TESTING

Referring to FIG. 9, once a test is chosen, the next step is to evaluate the test outcome to provide the test data (Good/Bad with associated confidence factor, or Unknown) (steps SS40-50). The diagnostic model is then analyzed using the hybrid inference engine to determine what additional information can be inferred from the new test outcome (step SS60). The inference engine has two parts, one employing logical inference, and one employing statistical inference. The first, logical, part, which is only active during the first phase of fault isolation as described above, computes logical inferences based on the test outcomes according to i) the STAMP model assumption that there is a single fault or a limited number of specified multiple faults to be isolated and hence a single valid diagnostic conclusion; and ii) eight inference meta-rules (wherein a Good/pass outcome is equivalent to "false" in logic and a Bad/fail outcome is equivalent to "true"):

1. IF a test t[j] is unknown, THEN no inference is available except t[j] is unknown.
2a. IF a test t[j] is false, AND test t[j] is not a negative inference test, as defined hereinafter, THEN every test upon which it depends is false.
2b. IF a test t[j] is false, AND test t[j] is not a negative inference test, THEN every conclusion upon which it depends is false.
3a. IF a test t[j] is true, AND test t[j] is not a positive inference test, as defined hereinafter, THEN every test that depends on t[j] is true.
3b. IF a test t[j] is true, AND test t[j] is not a positive inference test, THEN every conclusion upon which t[j] does not depend is false (due to the single conclusion assumption noted hereinabove).
3c. IF a test t[j] is true, AND test t[j] is not a positive inference test, THEN any test t[p] that is currently unknown and is not a dependency of t[j] is not needed, UNLESS declaring t[p] not needed creates a new ambiguity among the conclusions (due also to the single conclusion assumption).
4. IF after rules 1-3 have been evaluated, any t[p] is unknown and depends on all of the unknown conclusions, THEN t[p] is true.
5. IF after rules 1-4 have been evaluated, any t[p] is unknown and depends only on false conclusions, THEN t[p] is false.
6. IF the outcome of test t[j] is linked, as defined hereinafter, to an outcome of t[i], THEN the outcome of t[i] is determined by the linkage, AND rules 1-5 are applied to t[i].
7. IF a test t[j] is true, AND t[j] is a negative inference test, AND t[j] is cross-linked, as defined hereinafter, to a positive inference test t[i], THEN t[i] is true.
8. IF a test is false, AND t[j] is a positive inference test, AND t[j] is cross-linked to a negative inference test t[i], THEN t[i] is false.

For purposes of these tests, a negative inference test is defined to be a test that will result in inference only if it has a true value. If the value of a negative inference test is false, then no inference can be made except the value of the test. A positive inference test, on the other hand, is defined to be a test that will result in inference only if it has a false value. If the value of a positive inference test is true, then no inference can be made except the value of the test. The linkage mentioned in rule 6 refers to the situation in which a test t[j] being true triggers the value of a linked test t[i] being false, and a test t[j] being false triggers the value of t[i] to be true. The cross linkages mentioned in rules 7 and 8 mean that two tests are declared to be asymmetric (i.e. either positive or negative inference), and as such, a false value for a negative inference test triggers a false value in a linked positive inference test, and a true positive inference test triggers a true value in a linked negative inference test.

It will be appreciated that other sets of inference rules, or other reasoning approaches may also be used to derive information from the test data for use in the diagnostic process.

The second, statistical, part of the inference engine functions throughout the entire diagnostic process (and thus in parallel with the logical part during the first phase of test selection when the inferential part is active). Several statistics based on the evidence gathered are computed that describe the level of certainty for each diagnostic conclusion in the model that it is the correct conclusion. This computation incorporates a method of attributing evidence to conclusions in the model to compute measures of support and plausibility for the conclusions. As is known from Dempster-Shafer theory, there are two measures of the amount of evidence accumulated for a conclusion—"belief" and "plausibility." They are directly related to the evidence provided by tests. Support evidence from a test affects the belief of a conclusion. Belief differs from support in that it represents the total support evidence available for a given conclusion; support is that portion of the evidence from one test that is directed to a given conclusion. The Support$_{Total}$[c$_1$] value used below is analogous to belief.

Denial evidence affects the plausibility of a conclusion. Just as belief is the accumulation of support, plausibility is the accumulation of denial. However, it has a different sense than denial. Plausibility represents the upper limit on the belief. The relation between belief and plausibility is:

If the belief in a proposition A is equal to Pr(A) (the probability that A is true), the denial of proposition A is equal to the Pr(not A), $0 \leq$ Pr(not A) and Pr(A)+Pr(not A)$\leq$1.0, then Pr(A)$\leq$1-Pr(not A) or belief$\leq$plausibility Evidence for a proposition is represented by a credibility interval [belief, plausibility]. Each interval is a subinterval of the probability interval [0,1] with the lower bound (the belief) representing the degree to which the evidence supports the hypothesis, and the upper bound (the plausibility) represents the degree to which the evidence fails to refute the hypothesis. Under Dempster-Shafer theory, the difference between belief and plausibility represents the residual ignorance or uncertainty. Under Bayesian theory, the total probability of a proposition and its negation must be one, while under Dempster-Shafer theory, these probabilities do not necessarily sum to 1. The difference is uncertainty. Thus, the support measure quantifies the amount of supporting evidence for a given conclusion and is given by the confidence in the test outcome. Plausibility, on the other hand, provides a measure of the denial of conclusions and is simply one minus the support of all conclusions not supported by the test outcomes. The advantage of a Dempster-Shafer approach to estimating levels of certainty over a Bayesian approach is that prior probabilities do not need to be determined. Rather, the support and plausibility measures are determined solely by testing, the confidences in the test outcomes, and the known relationships between tests and conclusions.

The computations performed by the statistical part of the inference engine are based on a modified version of the Dempster-Shafer evidential reasoning process. This process associates a confidence value with each test outcome in the range of 0.0 ... 1.0. As noted hereinabove, base confidences define maximum confidence values for good and bad outcomes respectively. In addition, the user specifies if qualifiers are to be associated with the good and bad outcomes. If qualifiers are not associated, then the base confidences are selected as default confidence values, e.g., 0.999, which advantageously can be either predetermined independently of the diagnostic model or can be specified for a particular model at the time the model is being developed. If qualifiers are associated, then the user (optionally) lists the appropriate qualifiers in decreasing order of confidence level. Otherwise, default qualifiers, e.g., certain, somewhat certain, marginal, somewhat uncertain, uncertain, are used. Once the qualifiers are associated, good test and bad test confidence values are assigned to the qualifiers as follows:

Confidence[t$_k$]={½[(N−i)/(N−1)]*Base Confidence)+0.5 where

Confidence[t$_k$]=the good/bad confidence value for the good/bad outcome of test t$_k$ Base Confidence=the corresponding good or bad base confidence assigned to the test N=the total number of qualifiers (N$\geq$2)

i=the ordinal number of the selected qualifier

For example, given the default qualifiers and a good base confidence of 1.0, good test confidence values would be assigned as follows:

| certain | 1.0 |
|---|---|
| somewhat certain | 0.875 |
| marginal | 0.75 |
| somewhat uncertain | 0.625 |
| uncertain | 0.5 |

At the outset of the statistical computations, the total accumulated support and denial values for each conclusion, Support$_{Total}$[c$_1$] and Denial$_{Total}$[c$_1$], respectively, and the uncertainty signal S$_U$ are each initialized to 0.0; and the plausibility value for each conclusion, Plausibility[c$_i$], and the Uncertainty value are each initialized to 1.0. If a test outcome is true, then that test outcome supports conclusions upon which it depends and denies conclusions upon which it does not depend. On the other hand, if the test outcome is false, then that test outcome supports conclusions upon which it does not depend and denies conclusions upon which it depends. The amount of support for a given conclusion i by a given test t$_k$ outcome is computed as follows:

$$\text{Support}[c_i]=\text{Confidence}[t_k]/|C|$$

where

C=set of conclusions supported

|C|=size of C.

Denial[c$_i$]=Confidence[t$_k$]

The above equations apply only for computing support and denial from a single source of evidence. Evidence furnished by multiple information sources are combined using a modified form of Dempster's Rule of Combinations. First a measure of internal conflict K is computed:

$$K=\Sigma_i\Sigma_j(\text{Support}_{Total}[c_i]^* \text{Support}[c_j]; i<>j.$$

Next, the number of conflicts is tallied. A conflict occurs when the outcome of a test denies all of the current hypotheses, which hypotheses correspond to candidate signals S$_C$, and are determined in the manner described hereinbelow.

To determine the current hypothesis, all of the tests must have a value (good, bad, unavailable, or unneeded). At this point in the diagnosis procedure, the first phase of the test selection process has been completed and the second phase has been commenced. Since most users are at least intuitively familiar with probability, preferably the first step in determining the current hypothesis (or hypotheses) is to compute an estimate of the probability that each conclusion is the answer. The evidential support and plausibility statistics for each conclusion are converted to an estimated probability value S$_P$[ci] (signal S$_P$) as follows:

$S_P[c_i] = \frac{1}{2}(\text{Support}_{Total}[c_i] + \text{Plausibility}[c_i])$.

The estimated probability of the UR, defined hereinafter, is treated as a special case by assuming its estimated probability is strictly the value of Support[U] (the support for the UR calculated as set forth hereinbelow, which corresponds to signal $S_U$). This is because Plausibility[U] for the UR is always 1.0, which would unacceptably force the estimated probability to be at least 0.5 regardless of whether any conflict has been encountered. (Although this creates potential problems when values are normalized, since different types of values are being normalized, the ability of the diagnostic tester to determine the sufficiency of testing does not appear to be adversely affected.) The conclusion with the highest probability is automatically considered a hypothesis (signal $S_{CP1}$). A determination is then made whether any other conclusions have probabilities close enough to the maximum to be considered a hypothesis as well. A threshold function is used to make this determination:

If $S_{P1} \leq 0.1$, then Threshold $= 0.5 * S_{P1}$
If $S_{P1} \geq 0.5$, then Threshold $= 0.9 * S_{P1}$
Else Threshold $= S_{P1} * (0.4 + S_{P1})$.

If any conclusion has a probability value that exceeds the threshold, then that conclusion is also considered a hypothesis (signal $S_{CPn}$).

In accordance with the present invention, the Dempster-Shafer method is modified so that direct conflict between test outcomes and hypotheses results in an overall increase in uncertainty in the system. This modification entails the introduction of a new diagnostic conclusion, referred to herein as the "unanticipated result" (UR). The UR is never denied, and it is supported only in the event of a conflict. The current support value for the UR, i.e., signal $S_U$, is computed as follows in the absence of conflict:

$S_U = S_U * (\text{Tests} - 1)/\text{Tests}$.

In the event of a conflict, a $S_U$ value is calculated as above, and an additional computation is made using this value to derive the $S_U$ signal value used to determine the sufficiency of the testing:

$S_U = S_U + (\text{Conflicts} * K * \text{Confidence}[t_k])/\text{Tests}$ where
Conflicts = the number of times a conflict is encountered
Tests = the number of tests performed and actually evaluated so far (does not include tests for which outcomes have been inferred; each repetition of the same test is counted)

The new current total support for each conclusion in the model, Support$_{Total}[c_i]$, based on the accumulated test data currently inputted, is then computed:

Support$_{Total}[c_i] = (\text{Support}_{Total}[c_i] * \text{Support}[c_i] + \text{Uncertainty} * \text{Support}[c_i] + \text{Support}_{Total}[c_i] * (1 - \text{Confidence}[t_k]))/(1 - K)$.

If Support[$c_i$] is less than 1/Conclusions, where the Conclusions value is the number of conclusions in the diagnostic model, then Support[$c_i$] is reduced by 25% to gradually remove the conclusion from consideration. Next, a new uncertainty value is computed:

Uncertainty $= (\text{Uncertainty} * (1 - \text{Confidence}[t_k]))/(1 - K)$.

Finally, the support values Support[$c_i$] are normalized as indicated above. Each total support value is normalized to sum to 1.0 minus the support for the UR:

Support$_{Total}[c_i] = \text{Support}_{Total}[c_i] * (1 - S_U) \Sigma_j \text{Support}_{Total}[c_j]$ In addition to computing the support values for the conclusions in the model, the denial values must also be computed. Denial is computed as follows:

Denial$_{Total}[c_i] = \text{Denial}_{Total}[c_i] + \text{Denial}[c_i]$.

From the denial computation, plausibility is computed:

Plausibility[$c_i$] $= 1 - (\text{Denial}_{Total}[c_i]/\text{Tests})$.

Figure 11:
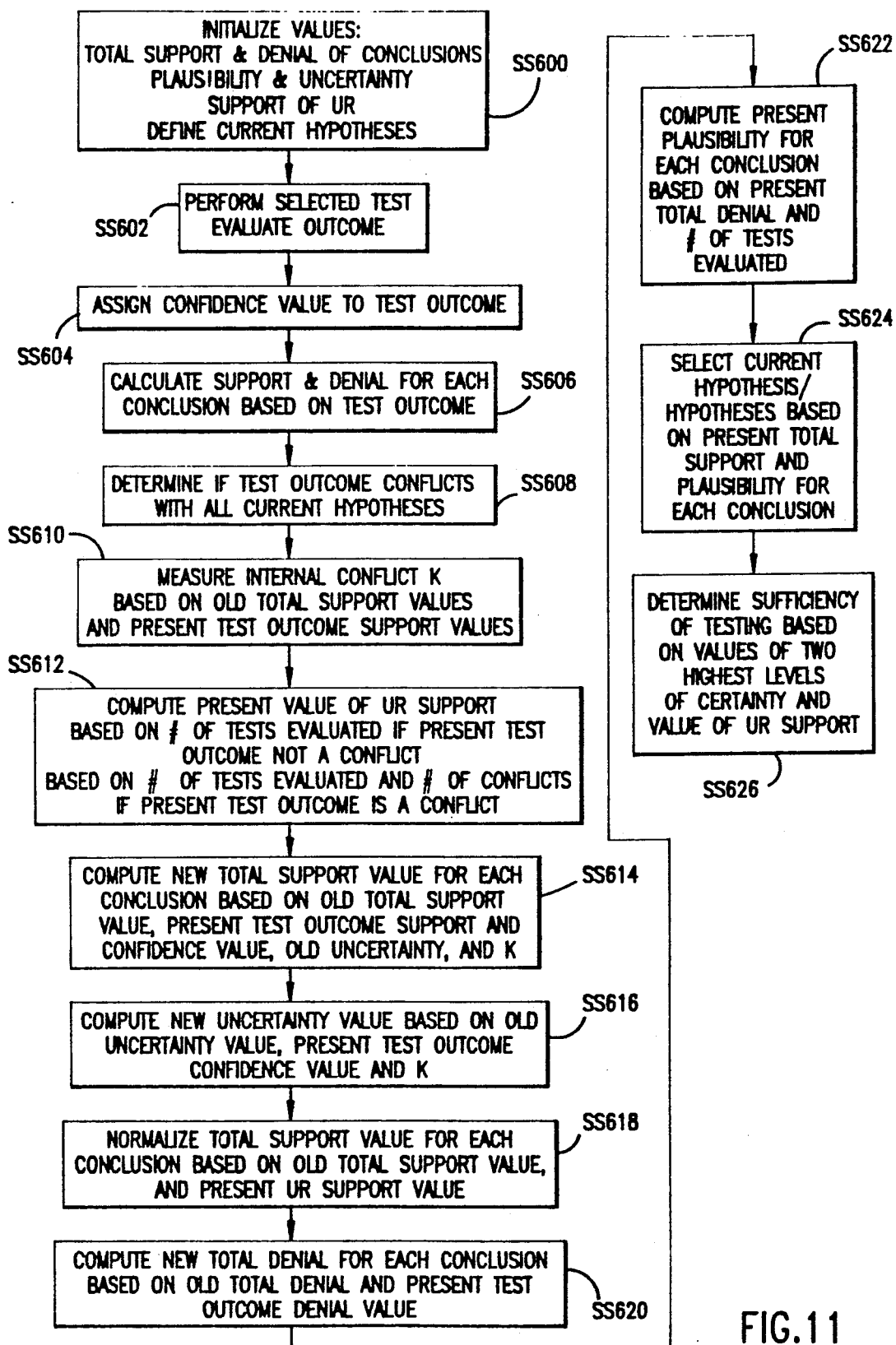
FIG. 11 is a more detailed flow chart of a preferred evidential reasoning based process performed by a diagnostic tester in accordance with the present invention for selecting a conclusion from among a plurality of conclusions as a diagnosis based on inputted test signals.

To summarize the computational flow, as shown in FIG. 11, the first step (SS600) is to initialize the values for total support and denial of conclusions, plausibility and uncertainty, support of the UR; and to define the initial current hypotheses. (All of the possible model conclusions advantageously are selected as the initial hypotheses.) The next step (SS602) is to perform a test selected as described hereinabove, and evaluate the outcome. Then, (SS604), a confidence value is assigned to the test outcome; and the support and denial for each conclusion are calculated based on the test outcome confidence value (step SS606). The next step (SS608) determines if the test outcome conflicts with all current hypotheses. Then the measure of internal conflict K is obtained (SS610) based on the old total support values and the present test outcome support values for all of the conclusions. The present value of the UR support is then computed based on the number of tests evaluated, if the present test outcome is not a conflict; and based on the number of tests evaluated and the number of conflicts, if the present test outcome is a conflict (SS612). Next (SS614), the new total support value for each conclusion is computed based on the old total support value, the present test outcome support value and confidence value, the old uncertainty, and K. Then a new uncertainty value is computed based on the old uncertainty value, the present test outcome confidence value and K (SS616). The next step (SS618) is to normalize the total support value for each conclusion based on the old total support value, and the present UR support value. Then (SS620), a new total denial is computed for each conclusion based on the old total denial and the present test outcome denial value. Next (SS622), the present plausibility is computed for each conclusion based on the present total denial and the number of tests evaluated. The current hypothesis/hypotheses (signals $S_{CP}$) is/are selected (SS624) based on the present total support and the plausibility for each conclusion. Finally (SS626), the sufficiency of testing is evaluated based on values derived for the two highest levels of certainty, $S_{P1}$ and $S_{P2}$, and the value of the UR support, $S_U$, in the manner to be described in more detail next, to determine whether to continue or terminate further testing, and whether to declare a diagnosis.

TERMINATING THE DIAGNOSTIC PROCESS

The testing sufficiency evaluation approach of the present invention operates to recognize when sufficient differentiation between levels of certainty regarding the validity of alternative candidate diagnoses exists. In the preferred implementation described herein, a neural network is trained to recognize patterns in the levels of certainty indicative of whether a diagnosis can be made or there is so much conflict that the diagnosis process should be halted. Further, the preferred neural network is configured to be generic, that is, it can be used without modification or retraining for different diagnosis (classification) problems and different diagnosis models.

Figure 12:
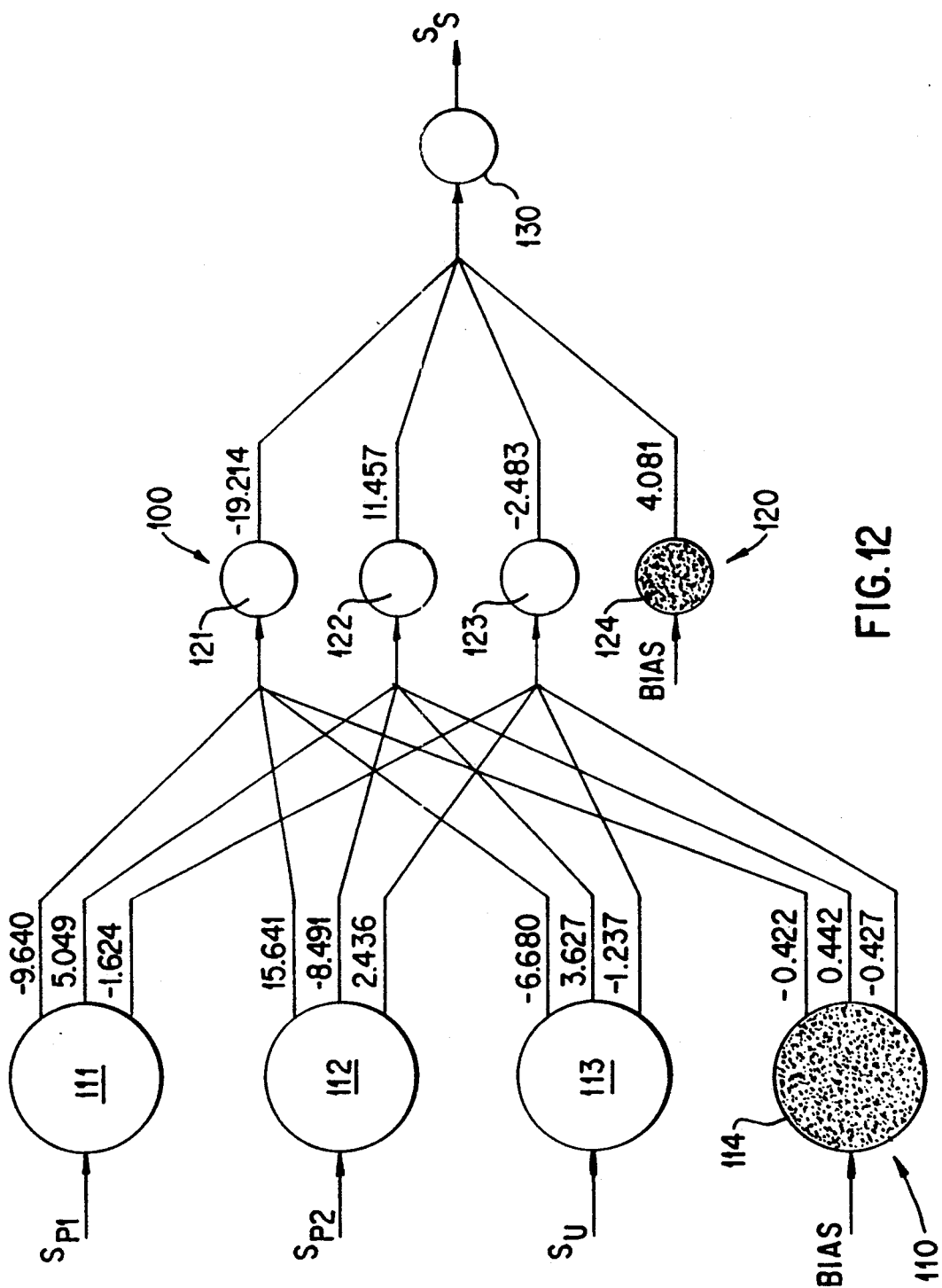
FIG. 12 is a diagrammatic illustration of first embodiment of a neural network in accordance with the present invention for determining the sufficiency of the testing by a diagnostic tester.

Referring to FIG. 12, a neural network 100 according to the present invention preferably comprises a set 110 of at least first, second, third and fourth input nodes and 114, respectively. Each of the input nodes has first, second and third outputs weighted by a predetermined fixed weight. Input nodes 111 and 112 respectively receive certainty signals $S_{P1}$ and $S_{P2}$ as an input. Input node 113 preferably receives uncertainty signal $S_U$, but this input need not be present; and input node 114 is a bias node receiving a predetermined, e.g., unity, bias signal.

If desired, additional input nodes can be provided which receive additional certainty signals corresponding to the successive next highest levels of certainty associated with the model conclusions. Such additional certainty signals can also include signal $S_N$ referred to hereinabove corresponding to the level of certainty that some conclusion other than the model conclusions and the UR is the correct diagnosis. However, for the disclosed preferred embodiment, additional input nodes are not necessary. Since the testing sufficiency determination does not depend on the character of the conclusions constituting the leading hypothesis, only one node is needed corresponding to the highest level of certainty (estimated probability value in the preferred embodiment). In addition, since only a single failure is being isolated by any given analysis, it is only necessary to compare the highest probability value with the next highest in order to determine whether the highest is "high enough."

Figure 13:
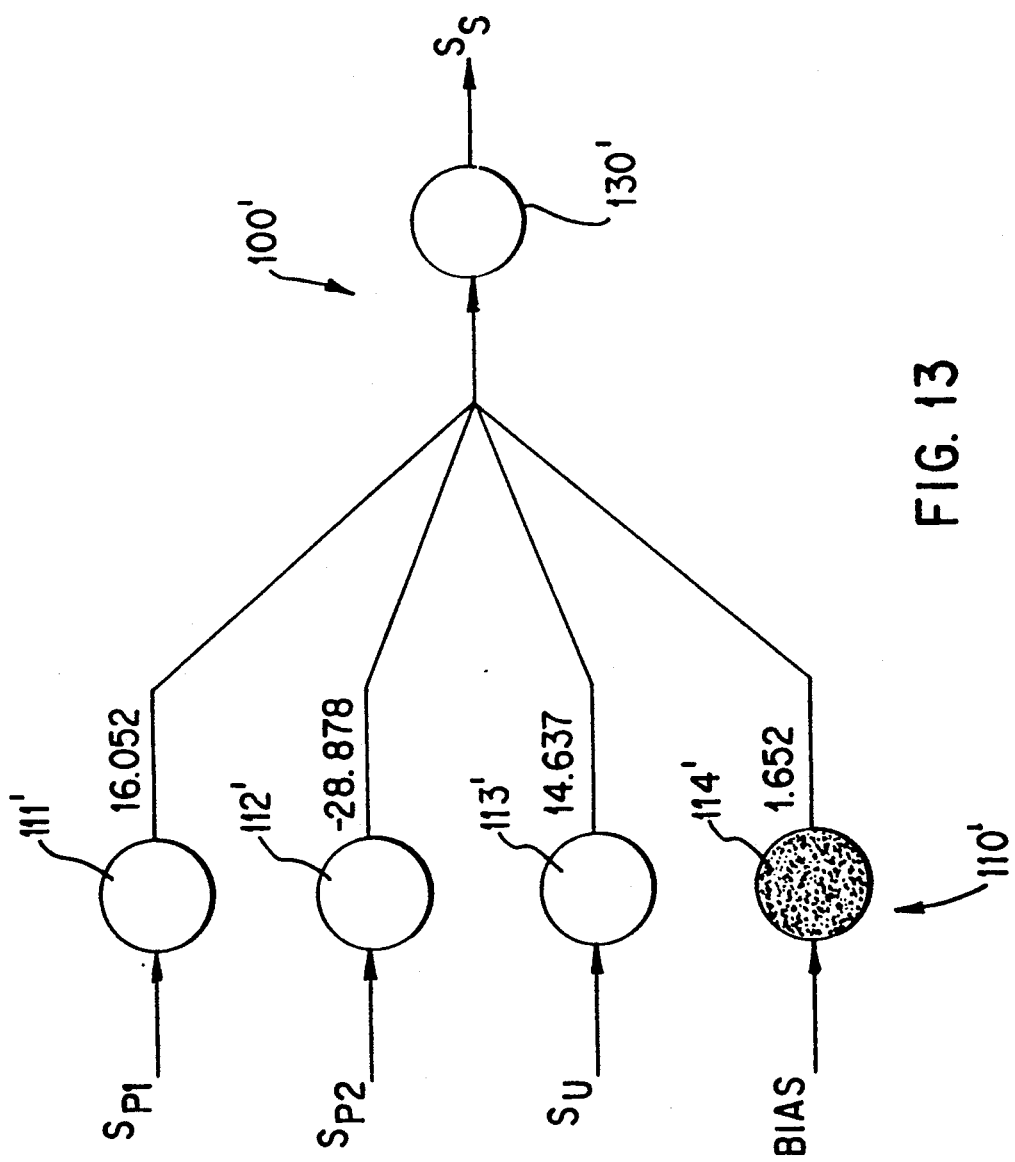
FIG. 13 is a diagrammatic illustration of a second embodiment of a neural network in accordance with the present invention for determining the sufficiency of the testing by a diagnostic tester.

Neural network 100 further comprises at least one set 120 of first, second, third and fourth intermediate nodes 121, 122, 123 and 124 each having an output weighted by a predetermined fixed weight. Intermediate node 111 receives the sum of the first weighted outputs of input nodes 110 as an input, intermediate node 122 receives the sum of the second weighted outputs of input nodes 110 as an input, intermediate node 123 receives the sum of the third weighted outputs of input nodes 110 as an input, and intermediate node 124 is a bias node like node 114 receiving the predetermined bias signal. At least one intermediate layer is preferred, but not necessary. FIG. 13 shows a viable two layer neural network which has been implemented.

The always active bias nodes provided in the input and intermediate layers are generally required to ensure that there is always some activity coming into each node of the upper layers, and to prevent singularities.

Neural network 100 also comprises a single output node 130, responsive to the sum of said weighted outputs of intermediate nodes 120, for producing output signal $S_S$ indicative of whether sufficient test data has been evaluated to declare a diagnosis. Only a single output node is needed for the preferred embodiment because only of simple "Yes/no" determination needs to be made.

The output weights of input and intermediate nodes 110 and 120 correspond to a model of expert data correlating combinations of at least certainty signal values, and preferably certainty and uncertainty signal values, with at least one expert opinion regarding the ability to declare a diagnosis on the basis of each combination of such signal values. The expert data model can either be specific to a type of system being diagnosed, or as will be described in more detail hereinafter, can be generic to systems in general.

The node output weights advantageously are obtained by training a backpropagation neural network having the same architecture as said neural network using empirical certainty and uncertainty signal training data obtained from testing of real systems, and conclusions derived from at least one expert regarding the sufficiency of the information represented by the combinations to declare a diagnosis for a specific system to be tested.

Alternatively, and preferably, the backpropagation neural network is trained using normalized randomly generated certainty and uncertainty signal training data, and conclusions derived from at least one expert regarding the sufficiency of the information represented by said combinations to declare a diagnosis for systems in general.

Preferably, the estimated probability values of the certainty and uncertainty signals are applied as the inputs to nodes 111 and 112. The training data includes first, second and third unambiguous combinations in which the data sufficiency determination is obvious. Advantageously, one unambiguous combination comprises certainty signal $S_{P1}$ having a probability value corresponding to 100% and certainty signal $S_{P2}$ and uncertainty signal $S_U$ having zero values. Another unambiguous combination advantageously comprises certainty signal $S_{P1}$ and uncertainty signal $S_U$ each having a probability value corresponding to 100%, and certainty signal $S_{P2}$ having a zero probability value. The third unambiguous combination advantageously comprises both of the certainty signal $S_{P1}$, $S_{P2}$ probability values having uniform probabilities and the uncertainty signal $S_U$ probability value having a zero value.

The neural network training data preferably also includes two data sets each having a predetermined number of ambiguous combinations wherein:

both data sets have certainty signal probability values within a closed interval [0,1] generated at random according to a lognormal distribution;

a first one of the data sets has uncertainty signal probability values generated at random according to a lognormal distribution;

a second one of the data sets has uncertainty signal probability values set to zero;

the values so generated are adjusted by normalizing the certainty signal probability values in each ambiguous combination to sum to $1 - S_U$;

all normalized certainty signal probability values and the uncertainty signal probability values less than or equal to a predetermined value based on the number of elements in the system are set to zero;

the resultant certainty and uncertainty signal values in each of the ambiguous combinations are normalized to sum to the value one; and the larger of the resultant normalized certainty signal probability values is designated as the value input to node 111 in each of the ambiguous combinations where the certainty signal probability values are unequal.

Preferably, the sum of the weighted outputs inputted to each of the intermediate nodes 120 and to output node 130 is processed in the respective node with a sigmoidal activation function, which preferably is also logistic, and preferably the function $1/(1+e^{-x})$, where x is the unweighted output of a given node.

An exemplary set of training data and the survey data from which the training data was derived are shown in the following charts:

| ANSWER | | | | | SURVEY | | | | | | |
|---|---|---|---|---|---|---|---|---|---|---|---|
| c1 | c2 | c3 | c4 | c5 | c6 | c7 | c8 | c9 | c10 | UR | |
| .47 | | | | | .30 | | | | | .23 | |
| | | | .22 | .36 | .16 | | | | .25 | | |
| | | | .40 | .19 | | | .40 | | | | |
| | | | | .39 | | | | | .34 | .27 | |
| .17 | | | .41 | .23 | .19 | | | | | | |
| | | .19 | .17 | | .27 | | | | .37 | | |
| | | .32 | .21 | | | | .18 | | .29 | | |
| | | | .11 | .11 | .14 | | | .21 | .14 | .30 | |
| .64 | .16 | | .20 | | | | | | | | |
| .29 | | .36 | | | .16 | | | | .20 | | |
| | | | .17 | .21 | .22 | .19 | | .20 | | | |
| | | .23 | .24 | .20 | | | .19 | | .15 | | |
| .44 | | .26 | | | | | | | .30 | | |
| .33 | | | | | .22 | .26 | .19 | | | | |
| | .21 | .18 | .18 | | .42 | | | | | | |
| .20 | | | .26 | | | .16 | | | .19 | .19 | |
| | | | | .16 | .35 | .18 | .14 | | .17 | | |
| .23 | .25 | | | | | | | .17 | .34 | | |
| .22 | | | .21 | .18 | | | .24 | | | .16 | |
| .11 | | | .13 | | | | .21 | .12 | .25 | .17 | |
| .15 | | | | .50 | .19 | | | | .16 | | |
| | .39 | | | | .24 | | | | .18 | .19 | |
| | | .17 | .20 | | .20 | | .24 | .19 | | | |
| | | | .23 | | | .54 | | .22 | | | |
| .13 | | .13 | .18 | .20 | | | .22 | .14 | | | |
| | | | | .16 | .35 | .18 | .14 | | .17 | | |
| .52 | | | .26 | | | .22 | | | | | |
| .17 | | | .41 | .23 | .19 | | | | | | |
| | | | .16 | .21 | | | | .23 | | .40 | |
| .17 | .22 | | | .11 | .15 | .20 | | | .14 | | |
| .15 | .25 | .25 | | | .18 | | .16 | | | | |
| .52 | | .48 | | | | | | | | | |
| | .21 | | | | .39 | .24 | | | .16 | | |
| | .10 | | .08 | .06 | .07 | .06 | | .07 | | .56 | |
| .15 | | | | .50 | .19 | | | | .16 | | |
| .16 | | .18 | | .16 | .29 | | | | | .20 | |
| | .25 | | | .21 | .53 | | | | | | |
| | | | .25 | | | .50 | | | .25 | | |
| | | | .39 | | | | | | .24 | .27 | |
| | | | | | .25 | .40 | .35 | | | | |
| .17 | .19 | | | | .25 | .16 | .24 | | | | |
| .16 | | | | .45 | | | | .39 | | | |
| .16 | | | .41 | .24 | | | | .21 | .14 | | |
| | | | | | | .19 | .31 | | .26 | | .24 |

Also shown in the training data are the answers selected according to the answers provided by the polled experts regarding the ability to make a confident diagnoses based on the probability value combinations. Since it was desired that neural network 100 be conservative in making a termination determination, if any expert indicated that a combination warranted termination, that answer was selected as the answer to be used in training the network. It will be appreciated that the survey included combinations containing ten probability values plus a UR probability value. The probability values were generated as indicated above, with all values less than or equal to 0.1 being set to 0.0. The surveyed experts were engineers who were familiar with and had used STAMP. The experts were instructed to assess the survey combinations on the basis of the following assumptions:

1. A system that has failed is being tested based on a diagnostic model.

2. The $c_n$ numbers represent probabilities derived from the testing that a unit($c_n$) within the system is the failure.

3. The failure events are independent and a testability analysis has shown that each of the conclusions listed is reachable and unique in a perfect information environment.

4. The UR value represents the probability that something has occurred in the system that the model currently cannot account for.

The training data set forth hereinabove has been applied to a backpropagation neural network having random initial output weight values and trained using a conventional backpropagation training program wherein each combination of certainty and uncertainty signal values was repeatedly applied to the corresponding input nodes of the neural network. An error value was computed following each application corresponding to how much the actual output of node 130 differed from the expected output for the combination as defined by the selected expert answer in the training data. Specifically, the error was computed as the squared error:

$$E = \tfrac{1}{2} \sum_{p=o}^{n_o-1} \sum_{i=o}^{n_o-1} (T_i^{(p)} - O_i^{(p)})^2$$

where
$\Sigma$ = the measure of squared error
$n_p$ = the number of patterns in the training set
$n_o$ = the number of output nodes = the current input pattern
i = the current output/target node
$T_i^{(p)}$ = the expected output of node i given pattern p
$O_i^{(p)}$ = the actual output of node i given pattern p From the value E, a correction term is computed which is then propagated backward through the network, adjusting the node weights as it goes. The correction term is computed from the partial derivative of the error with respect to the weights. The weight adjustment occurs as follows:

$$w_{ji}^{(k)}(t+1) = \eta \sum_{p=o}^{n_o-1} \delta_o^{(p,k)} O_j^{(p,k-1)} + w_{ji}^{(k)}(t) + \alpha \Delta w_{ji}^{(k)}(t)$$

where
$w_{ji}^{(k)}(t)$ = the weight from node j to node i at time t for layer k
$\eta$ = the learning rate
$O_j^{(p,k-1)}$ = the output of node j for combination p at layer $k-1$
k = the current layer
p = the current pattern
$n_p$ = the number of patterns
$\delta_i^{(p,k)}$ = the correction term for node i at layer k resulting from pattern p
$\alpha$ = momentum coefficient
$\Delta w_{ji}^{(k)}(t)$ = change in the weight at time t.
The correction term, $\delta_i^{(p,k)}$, is computed as follows:
Case 1: (the output layer)
$\delta_i^{(p,k)} = (T_i^{(p)} - O_i^{(p,k)}) O_i^{(p,k)} (1 - O_i^{(p,k)})$
Case 2: (all hidden layers)

$$\delta_I^{(p,k)} = \left( \sum_{j=0}^{n_{k+1}+1} \delta_I^{(p,k-1)} w_{ji}^{(k-1)} \right) O_I^{(p,k)} (1 - O_I^{(p,k)})$$

Although the use of a backpropagation neural network is preferred, other types of neural networks can be used. For example, counterpropagation as developed by Robert Hecht-Nielson provides essentially the same functionality with a different architecture. Hopfield networks, Adaline networks, and other supervised learning networks could also be used.

As the training data is repeatedly presented to the neural network, the network weights are modified gradually, following the error surface defined by the network weight space down the gradient to a local minimum. When the network settles, it contains a solution to the mapping problem.

The node output weights which resulted from this training are:

the weights of the first, second and third outputs of input node 111 are (−9.640), 5.049, and (−1.624), respectively;

the weights of the first, second and third outputs of input node 112 are 15.641, (−8.491), and 2.436, respectively;

the weights of the first, second and third outputs of input node 113 are (−6.680), 3.627, and (−1.237), respectively;

the weights of the first, second and third outputs of input node 114 are (−0.422), 0.442, and (−0.427), the weights of the outputs of intermediate nodes 121, 122, 123 and 124 are, respectively, (−19.214), 11.457, (−2.483) and 4.081.

This collection of weights has proven to make testing sufficiency determinations which correlate highly with the opinions of experts exposed to the same data. Specifically, neural network 100 has been tested with a set of 2601 randomly generated test data representing all permutations of three numbers to two decimal places under the following constraints:

1. The numbers were all in the closed interval [0,1].
2. The numbers all summed to 1.0.
3. The first number was always greater than or equal to the second number.

Twenty of these cases were randomly selected as a test survey and submitted to the same group of five experts used to generate the training data. On average, 4.25 of the experts agreed with neural network 100 on each test case. In one case, neural network 100 indicated termination was not appropriate, while four of the experts said it was appropriate. This case was at the decision boundary of the neural network, and could have been decided either way. Thus, overall, the performance of neural network 100 was in agreement with the experts.

It will be appreciated by those skilled in the art that the invention has been described with respect to exemplary embodiments, and that numerous modifications can be made therein without departing from the scope and spirit of the invention.

What is claimed is:

1. An improved electronic diagnostic tester for evaluating a failure state of a system having a defined number of functional elements, said diagnostic tester comprising:

an electronic signal input interface for providing electronic test signals;

evaluating means, responsive to at least one inputted test signal corresponding to test data relating to at least one predetermined parameter of the system, for producing:

a set of possible diagnoses of the failure state of the system ranked according to a level of certainty associated with each diagnosis of being valid;

first and second candidate signals corresponding respectively to first and second ones of said possible diagnoses respectively having the first and second highest levels of certainty of being valid, and first and second certainty signals corresponding respectively to values of said first and second highest levels of certainty; and testing sufficiency means, responsive to said first and second certainty signals, for producing an output signal indicative of whether sufficient test data has been evaluated to declare a diagnosis.

2. The diagnostic tester of claim 1 wherein:

said evaluating means also produces an uncertainty signal corresponding to a measure of the uncertainty that the evaluated at least one test signal can be validly evaluated; and said testing sufficiency means also evaluates said uncertainty signal to produce said output signal.

3. The diagnostic tester of claim 2 wherein:

said evaluating means also produces a signal $S_N$ corresponding to a measure of the level of certainty that a diagnosis not corresponding to said first or second candidate signals or to said uncertainty signal is a valid diagnosis;

said testing sufficiency means also evaluates said signal $S_N$ to produce said output signal.

4. The diagnostic tester of claim 2 wherein said evaluating means comprises:

means for storing a model of predetermined information flow relationships within the system under test;

means for associating said test signals with sets of possible failure state causes in accordance with said model, and for ascertaining the intersections of said sets of possible causes for combinations of test signals, said candidate signals being derived from said intersections; and means for determining for each candidate signal a measure of the level of certainty that it represents a valid diagnosis.

5. The diagnostic tester of claim 4 wherein said evaluating means comprises UR determining means for determining the degree to which a conflict exists between at least said first candidate signal and said at least one test signal indicative of the level of certainty that an unanticipated result (UR) has been obtained, said uncertainty signal having a value corresponding to said UR level of certainty.

6. The diagnostic tester of claim 5 wherein said UR determining means comprises:

means for defining a plurality of conclusions corresponding to possible diagnoses of the system;

means for assigning a confidence value to each successively inputted test signal;

means for calculating the support and denial for each conclusion based on said confidence value of the currently inputted test signal;

means for determining if the currently inputted test signal conflicts with a then selected set of said conclusions corresponding to candidate signals;

means for obtaining a measure of internal conflict based on accumulated total support values and the current test signal support values for all of said conclusions;

means for computing the present value of said uncertainty signal based on the number of test signals evaluated, if the present test signal is not a conflict; and based on the number of test signals evaluated and the number of conflicts, if the present test signal is a conflict;

means for computing a new total support value for each conclusion based on the old total support value, the present test signal support value and confidence value, an old uncertainty value, and said measure of internal conflict;

means for computing a new uncertainty value based on the old uncertainty value, the present test signal confidence value and said measure of internal conflict;

means for normalizing the total support value for each conclusion based on the old total support value, and the present uncertainty signal value;

means for computing a new total denial for each conclusion based on an old total denial and the present test signal denial value;

means for computing the present plausibility for each conclusion based on the present total denial and the number of test signals evaluated;

means for selecting the current set of candidate signals based on the present total support and the plausibility for each conclusion.

7. The diagnostic tester of claim 5 wherein the values said certainty and uncertainty signals correspond to probability values.

8. The diagnostic tester of claim 7 wherein said training data includes first, second and third unambiguous combinations, said first unambiguous combination comprising said first certainty signal having a value corresponding to 100% probability and said second certainty signal and said uncertainty signal having zero values, said second unambiguous combination comprising said first certainty signal and said uncertainty signal each having a value corresponding to 100% probability and said second certainty signal having a zero value, and said third unambiguous combination comprising both of said certainty signals having values corresponding to uniform probabilities and said uncertainty signal having a zero value.

9. The diagnostic tester of claim 8 wherein said training data includes two data sets each having a predetermined number of ambiguous combinations wherein:

both data sets have certainty signal values within a closed interval [0,1] generated at random according to a lognormal distribution;

a first one of said data sets has uncertainty signal values generated at random according to a lognormal distribution;

a second one of said data sets has uncertainty signal values set to zero;

the values to generated are adjusted by normalizing the certainty signal values in each ambiguous combination to sum to $(1-S_U)$, all normalized certainty signal values and the uncertainty signal values less than or equal to a predetermined value based on the number of elements in the system are set to zero; and then the resultant certainty and uncertainty signal values in each of said ambiguous combinations are normalized to sum to the value one; and the larger of the resultant normalized certainty signal values is designated as the first certainty signal value in each of said ambiguous combinations where the certainty signal values are unequal.

10. The diagnostic tester of claim 7 wherein:

the sum of the weighted outputs inputted to each of the intermediate nodes and the output mode is processed in the respective node with a sigmoidal activation function;

the weights of the first, second and third outputs of the first input node are $(-9.640)$, $5.049$, and $(-1.624)$, respectively;

the weights of the first, second and third outputs of the second input node are $15.641$, $(-8.491)$, and $2.436$, respectively;

the weights of the first, second and third outputs of the third input node are $(-6.680)$, $3.627$, and $(-1.237)$, respectively;

the weights of the first, second and third outputs of the fourth input node are $(-0.422)$, $0.442$, and $(-0.427)$, respectively;

the weight of the output of the first intermediate node is $(-19.214)$;

the weight of the output of the second intermediate node is $11.457$;

the weight of the output of the third intermediate node is $(-2.483)$; and the weight of the output of the fourth intermediate node is $4.081$.

11. The diagnostic tester of claim 10 wherein said activation function is logistic.

12. The diagnostic tester of claim 11 wherein said activation function is $1/(1+e^{-x})$, where x is the unweighted output of a given node.

13. The diagnostic tester of claim 2 wherein said uncertainty measure has a probability value.

14. The diagnostic tester of claim 2 wherein said testing sufficiency means comprises a neural network comprising:

a set of first, second, third and fourth input nodes each having first, second and third outputs weighted by a predetermined fixed weight, said first and second input nodes respectively receiving said first and second certainty signals as an input, said third input node receiving said uncertainty signal, and said fourth input node receiving a predetermined bias signal;

a set of first, second, third and fourth intermediate nodes each having an output weighted by a predetermined fixed weight, said first intermediate node receiving the sum of the first weighted outputs of said input nodes as an input, said second intermediate node receiving the sum of the second weighted outputs of said input nodes as an input, said third intermediate node receiving the sum of the third weighted outputs of said input nodes as an input, and said fourth intermediate node receiving said predetermined bias signal; and an output node, responsive to the sum of said weighted outputs of said intermediate nodes, for producing said output signal.

15. The diagnostic tester of claim 14 wherein said output weights of said input and intermediate nodes correspond to a model of expert data correlating combinations of certainty signal values with at least one expert opinion regarding the ability to declare a diagnosis on the basis of each combination of certainty signal values.

16. The diagnostic tester of claim 14 wherein said output weights of said input and intermediate nodes correspond to a model of expert data correlating combinations of certainty and uncertainty signal values with at least one expert opinion regarding the ability to declare a diagnosis on the basis of each combination of certainty and uncertainty signal values.

17. The diagnostic tester of claim 14 wherein said output weights of said input and intermediate nodes have values obtained by training a backpropagation neural network having the same architecture as said neural network using empirical certainty and uncertainty signal training data obtained from testing of real systems, and conclusions derived from at least one expert regarding the sufficiency of the information represented by said combinations to declare a diagnosis for a specific system to be tested.

18. The diagnostic tester of claim 17 wherein said output weights of said input and intermediate nodes have generic values obtained by training a backpropagation neural network having the same architecture as said neural network using normalized randomly generated certainty and uncertainty signal training data, and conclusions derived from at least one expert regarding the sufficiency of the information represented by said combinations to declare a diagnosis for systems in general.

19. The diagnostic tester of claim 1 further comprising a controller responsive to said evaluating means and to said testing sufficiency means output signal for controlling said evaluating means and said signal input interface to control the test signals provided for evaluation and the continued evaluation of test signals.

20. The diagnostic tester of claim 19 wherein said signal input interface comprises operator actuated input means for entering test data relating to at least one predetermined aspect of the system, and for generating test signals corresponding to the test data.

21. The diagnostic tester of claim 19 wherein said signal input interface comprises an automatic tester responsive to a first control signal produced by said controller for performing selected tests on the system, and for generating test signals corresponding to the test results.

22. The diagnostic tester of claim 21
wherein said controller produces said first control signal to cause said automatic tester to perform at least one further selected test on the system if said output signal indicates that insufficient test data has been evaluated; and produces a conclusion signal indicative of a diagnosis in accordance with said first candidate signal if said output signal indicates that sufficient test data has been evaluated.

23. The diagnostic tester of claim 22 wherein said controller produces said first control signal to select said at least one further selected test in accordance with at least one prior evaluation of test signals.

24. The diagnostic tester of claim 19 further comprising:
a display; and
said controller is responsive to said output signal for controlling said display to indicate the need for additional test data and for controlling said signal input interface to accept a further at least one test signal for evaluation by said evaluating means if said output signal indicates that insufficient test data has been evaluated; and for controlling said display responsive to said first candidate signal to indicate a diagnosis if said output signal indicates that sufficient test data has been evaluated.

25. The diagnostic tester of claim 1 wherein the values of said first and second highest levels of certainty are probability values.

26. An automatic diagnostic tester for testing a system state according to a set of defined relationships between a plurality of sources for providing information about the system and a plurality of conclusions about the state of the system, said tester comprising:
an electronic signal input interface for providing electronic test signals corresponding to the information provided by the plurality of sources;
first control means for selecting the test signals provided by said signal input interface corresponding to successive ones of the information sources for evaluation according to the relative amount of information provided by each information source until the test signals for all of the information sources have been selected or the information which would be provided thereby has been determined;
second control means for further selecting the test signals provided by said signal input interface corresponding to successive ones of the information sources for evaluation according to which information source will increase the level of certainty that a selected candidate conclusion constitutes a valid diagnosis of the system state.

27. The diagnostic tester of claim 26 wherein said second control means comprises:
means for assigning a confidence value to the information provided by an information source;
means responsive to said confidence value and to the information provided by evaluated information sources for computing a level of certainty for each of the conclusions that the associated conclusion constitutes a valid diagnosis;
means for selecting candidate conclusions according to the relative values of the computed levels of certainty for each conclusion.

28. The diagnostic tester of claim 27 further comprising:
first means for identifying, if more than one candidate conclusion has been selected, which information sources, if any, depend on one of the two candidate conclusions with the then highest levels of certainty and not the other, and, if more than one such information source is identified, identifying which of such information sources furnishes the most information about the support for the candidate conclusion on which it depends.

29. The diagnostic tester of claim 28 further comprising:
second means, responsive to said first identifying means determining that no information source satisfies the identification criteria of said first identifying means, and responsive to said selecting means having then selected only one candidate conclusion, for identifying the information source, if any, that provides the most support for the candidate conclusion having the then highest level of certainty, if more than one candidate conclusion has then been selected, or for the candidate conclusion, if only one candidate conclusion has then been selected.

30. The diagnostic tester of claim 29 further comprising:
third means, responsive to said second identifying means determining that no information source satisfies the identification criteria of said second identifying means, for identifying the information source, if any, that supports the most conclusions other than the candidate conclusion having the then highest level of certainty.

31. An automatic controller for controlling the operation of a physical system, said controller comprising:
sensor means for sensing at least one predetermined system parameter indicative of an operating state of the system and producing output data signals indicative of the value of said at least one sensed parameter;
control means responsive to said sensor means output data signals for controlling a value of at least one operating parameter of the system to control the operating state of the system, said control means comprising:
evaluating means, responsive to said sensor means output data signals, for producing:
a set of possible diagnoses of the operating state of the system ranked according to a level of certainty associated with each diagnosis of being valid,
first and second candidate signals corresponding respectively to first and second ones of said possible diagnoses respectively having the first and second highest levels of certainty of being valid, and
first and second certainty signals corresponding respectively to values of said first and second highest levels of certainty; and
testing sufficiency means, responsive to said first and second certainty signals, for producing an output signal indicative of whether sufficient sensor output data signals have been evaluated to declare a diagnosis, said control means being responsive to said testing sufficiency means output signal.

* * * * *